US006337450B1

(12) United States Patent

Tanii et al.

(10) Patent No.: US 6,337,450 B1

(45) Date of Patent: Jan. 8, 2002

(54) METHOD AND APPARATUS FOR CLASSIFYING AND RECOVERING THE MAIN COMPONENTS OF USED BATTERIES

(75) Inventors: Tadaaki Tanii; Satoshi Tsuzuki; Shiro Honnmura; Takeo Kamimura; Takahiko Hirai; Masaaki Kurokawa; Reizou Miyauchi, all of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/456,562

(22) Filed: Dec. 8, 1999

(30) Foreign Application Priority Data

Dec. 8, 1998 (JP) .......................................... 10-348313
Aug. 20, 1999 (JP) .......................................... 11-234671

(51) Int. Cl.[7] ............................................... B07C 5/344

(52) U.S. Cl. ...................................................... 209/575

(58) Field of Search ................................ 209/571, 573, 209/575; 198/391, 392, 443; 324/426

(56) References Cited

U.S. PATENT DOCUMENTS 4,527,326 A * 7/1985 Kohno et al. ................. 29/705
5,147,023 A * 9/1992 Meindl ....................... 198/454

FOREIGN PATENT DOCUMENTS

| | | |
|---|---|---|
| EP | 580 241 B1 | 7/1993 |
| EP | 578 688 B1 | 6/1995 |
| EP | 580241 B1 * | 10/1996 |
| EP | 0 862 067 | 9/1998 |
| JP | 4-262294 A * | 9/1992 |
| JP | 6-215802 | 8/1994 |
| JP | 10-241748 | 9/1998 |
| JP | 11-167936 | 6/1999 |

OTHER PUBLICATIONS

Derwent Abstract 1992–362007 for JP 4–264294–A (cited supra).*

* cited by examiner

*Primary Examiner*—Donald P. Walsh
*Assistant Examiner*—Joseph C. Rodriguez
(74) *Attorney, Agent, or Firm*—Crowell & Moring LLP

(57) ABSTRACT

A method and an apparatus for classifying and recovering the main components of used batteries, particularly, a method and an apparatus by which the batteries are conveyed on a conveyor while an alternating magnetic field of a plurality of frequencies is applied to each and a detection means detects what sort of induced magnetic field has resulted from the eddy current induced in the battery. The orthogonal components in the change of the induced magnetic field are detected; the relationship between these orthogonal components and the frequencies are compared with the database of the same which is previously obtained, and the batteries are sorted according to their classification and size. This method can sort large amounts of used batteries continuously. In this invention, the battery will be drawn down into the detection region either magnetically or mechanically while the stable transport of the battery is achieved. The method and apparatus of the invention enable continuous bulk sorting of batteries, assure a smooth feed, and improve the accuracy with which the induced magnetic field generated in the battery is detected.

13 Claims, 24 Drawing Sheets

CHANGES IN THE INDUCED DIFFERENT BATTERIES
(NON MAGNETOSTATIC FIELD)

FREQUENCY CHARACTERISTIC DATA FOR SIZE D AND SIZE C BATTERIES (NON MAGNETOSTATIC FIELD)

FREQUENCY CHARACTERISTIC DATA FOR SIZE AA AND SIZE AAA BATTERIES (NON MAGNETOSTATIC FIELD)

FREQUENCY CHARACTERISTIC DATA FOR SIZE AA AND SIZE AAA BATTERIES
(MAGNETOSTATIC FIELD: 0.05T)

METHOD FOR DISCRIMINATING FOR DIFFERENT TYPES OF BATTERIES (EXAMPLE)
FOR DISCRIMINATING ALKALINE BATTERIES
(D SIZE AND B SIZE)
= (A*B*C) + (D*E*F)
(UNDER NO MAGNETOSTATIC FIELD, WHEN DISCRIMINATED SIGNALS OUTPUT WITH INTO EACH OF THE ZONES, LOGICAL OUTPUT "1" WILL BE APPLIED)

ACTUAL CONFIGURATION OF THE BATTERY SORTING DEVICE

METHOD AND APPARATUS FOR CLASSIFYING AND RECOVERING THE MAIN COMPONENTS OF USED BATTERIES

FIELD OF THE INVENTION

This invention concerns a method and an apparatus for classifying and recovering the main components of used batteries. More specifically, it concerns a method and an apparatus by which the batteries are conveyed on a conveyor while an alternating magnetic field is applied to each. A detection means detects what sort of induced magnetic field has resulted from the eddy current induced in the battery and in this way determines what sort of battery it is. The batteries being conveyed on the conveyor are brought to within a fixed distance of the detection means, and their travel path is constrained so as to maintain highly accurate detection.

BACKGROUND OF THE INVENTION

In order to prevent environmental pollution, make the fullest possible use of natural resources and aid recycling, it is desirable to classify used batteries according to their main components.

Devices have therefore been developed which can be used to classify used batteries without destroying them. Such apparatus apply an alternating magnetic field to a used battery to generate an eddy current. By measuring the magnetic field induced by this eddy current, one can classify the battery according to its main components.

However, the exterior of a battery is usually covered with an ornamental steel jacket which has a tendency to influence the magnetic characteristics.

In Japanese Patent Publication 6-215802, a design was proposed in which an alternating magnetic field was applied to the used battery and a very large magnetostatic field (a quasi-magnetostatic field) was also applied. The magnetostatic field would magnetically saturate the steel jacket.

The battery separator proposed in Japanese Patent Publication 6-215802 is characterized by the following features. It has at least one excitation coil (20), which is connected to three excitation means (21, 22 and 23) and which generates an alternating magnetic field; a positioning means to position the battery or storage battery (10) in the alternating magnetic field; three detection means (30, 31 and 32), which measure the induction while the battery or storage battery (10) is in the alternating magnetic field; and four means (41, 42, 24 and 34) to induce a quasi-magnetostatic field in the battery whose properties are being measured via the induction. The quasi-magnetostatic field will virtually saturate at least a part of the ferromagnetic portion of the battery or storage battery (10).

The numbers given above are those used in the drawings appended to Patent Publication 6-215802.

As is explained in the Patent Publication 6-215802, when the jacket of the battery is magnetically saturated, the magnetic characteristics of the used battery are no longer influenced by the jacket, but are now determined by the main components constituting the battery within the Jacket. Thus by measuring the field created by the eddy current induced by the alternating field, one can determine what the main components of the battery are.

However, in the prior art technique, when the steel jacket of the used battery is magnetically saturated, an attraction force is generated between the jacket and the coil. Thus this method is not suitable for continuous sorting of batteries.

If the batteries are positioned one by one inside the coil and a magnetic field is applied to them, the method described above can be used successfully to sort the batteries by composition. However, if a very large magnetostatic field is applied while a large number of batteries are being continuously fed or dropped into the coil, the batteries will be attracted to the coil when the field is applied, and the feed will be interrupted. This makes continuous sorting problematical.

When an alternating magnetic field is applied to the used batteries so that the induced magnetic field which is generated can be measured, the batteries, which are being conveyed on a belt, must be prevented from shifting up, down, left or right on the belt. When they are in position to be detected by the detection means, the distance between the battery and the detection means must remain fixed; and the batteries must be transported smoothly, without getting hung up.

However, because the prior art technique makes use of a saturation field, the field strength is extremely large. In practical terms, this means that it is difficult to achieve a smooth movement of the batteries on the belt.

SUMMARY OF THE INVENTION

In view of the shortcomings of the prior art, the object of this invention is to enable continuous bulk sorting of batteries, to assure a smooth feed, and to improve the accuracy with which the induced magnetic field generated in the battery is detected.

To address the aforementioned shortcomings in the prior art, the present invention is designed as follows. The method of sorting batteries according to the invention entails inducing in a battery being continuously conveyed a weak magnetic field and an alternating magnetic field containing numerous frequency components. The induced magnetic field created by the eddy current induced in the battery is then detected to determine what sort of battery it is. The strength of the induced magnetic field and the phase-shift are detected with respect to the alternating field. Based on the relationship between the classification/the size of the battery with respect to the strength/the phase-shift of the induced magnetic field which were previously obtained, the battery is then sorted according to type and size.

A further refinement of the method of sorting batteries according to the invention is characterized by the fact that the strength of the magnetostatic field is between 0.01 T (Teslas) and 0.3 T.

Another embodiment of the method of sorting batteries according to the invention entails inducing in a battery being continuously conveyed an alternating magnetic field containing numerous frequency components. The induced magnetic field created by the eddy current induced in the battery is then detected to determine what sort of battery it is. The strength of the induced magnetic field and the phase-shift are detected with respect to the alternating field. Based on the relationship between the classification/the size of the battery with respect to the strength/the phase-shift of the induced magnetic field which were previously obtained, the battery is then sorted according to type and size.

A further development of the foregoing method of sorting batteries is further characterized by the fact that the relationship between the type and size of the battery, and the strength and phase of its induced magnetic field has a tolerance range for every frequency component of the alternating field. From the set of tolerance ranges, the type and size of the battery can be determined.

Another refinement of the method of sorting batteries according to the invention is further distinguished by the fact that the strength of the magnetostatic field should be set at a level such that the feed of the batteries is not hindered.

With this invention, an eddy current is generated in batteries which differ in their main constituents. The induced magnetic field resulting from this eddy current causes characteristic changes depending on the materials which constitute the battery. By detecting these changes, the batteries can be sorted by their main ingredients.

In particular, if a weak magnetostatic field is superposed on an alternating field, the differences between the variations in eddy current which are observed with different sorts of batteries will be enhanced. Reducing or not applying the magnetostatic field allows the batteries to be conveyed at high speeds.

Using signals of multiple frequencies allows batteries to be sorted by composition with greater accuracy. Combining a number of sorting apparatuses allows batteries to be sorted by composition even though they may be of different sizes or shapes.

In a preferred embodiment of the invention, the strength of the magnetostatic field is between 0.01 T (Teslas) and 0.3 T, or 1/10 the field strength in the prior art apparatus. Because the field strength was so large in the prior art apparatus, stability could not be maintained in the battery feed. With the weaker field, the accuracy with which the induced magnetic field can be detected does not suffer, the frictional resistance of the batteries as they are transported on the conveyor is reduced, and the batteries can be moved smoothly.

The invention also includes apparatus for implementing the method of sorting batteries according to the invention. One embodiment of apparatus for sorting batteries according to the invention rotates a disk which is oriented obliquely and a second horizontal disk surrounding the first on an axis which intersects both disks. The outer disk is rotated faster than the inner, and the batteries are inserted at their common center. As the disks rotate, the batteries are arranged at fixed intervals, and this row of batteries is conducted via conveyor belt past a device which generates a weak magnetic field, one which generates an alternating magnetic field, and one which detects changes in the induced magnetic field. This device detects changes in the strength and phase of the induced magnetic field which are due to the composition of the battery for frequency components in at least two ranges. A signal processing device applies "AND" and "OR" logical operations to the data which are detected, and outputs them as a signal corresponding to what sort of battery each is. This output is used to send each sort of battery to a specific location.

Another embodiment of apparatus for sorting batteries according to the invention is characterized by the fact that it lacks the device for generating a weak magnetic field which is present in the previously described embodiment.

Another embodiment of apparatus for sorting batteries according to the invention is characterized by the fact that the conveyor belt is tilted along the axis of its width, and a device is used which lines up and conveys the batteries so as to stabilize the position of each battery as it passes the field generators.

A further embodiment of apparatus for sorting batteries according to the invention is characterized by the fact that the coil for inducing an alternating current, which is used as the device to generate an alternating magnetic field, and the detector coil, which is used as the device to detect changes in the induced magnetic field, are both local type coils. One of these coils is large and the other small. Both are placed on the same shaft. This arrangement gives the device the capacity to detect the composition of both large and small batteries.

With the apparatus according to the invention, (1) A rotating conveyor device feeds the batteries at fixed intervals. This arrangement prevents the detected signal of the battery from being disturbed by the noise signal generated by the next battery in line, thus improving the sorting capacity.

(2) The conveyor belt is tilted. The batteries being conveyed are brought past a fixed position with respect to the width of the belt. This minimizes variations of the detection signal, thus improving the sorting capacity.

(3) The local excitation coils are placed either above or below the conveyor belt. This improves the sensitivity of detection with respect to flat batteries.

(4) The size and shape of the local coils can be selected to correspond to the type and shape of the batteries being sorted. This allows a larger amplitude detection signal to be used, thus improving the sorting capacity.

(5) The coil used to detect changes in the induced magnetic field is placed orthogonal to the direction of the magnetostatic field. This enhances the effect of the magnetostatic field operating on the battery, thus improving the sorting capacity.

The invention also concerns a method for constraining the transport path of the batteries in order to bring each battery to within a fixed distance of the detection means.

In one embodiment of the method for sorting batteries according to the invention, an alternating magnetic field containing a number of frequency components is applied to a battery being continuously conveyed on a conveyor belt. The battery is then sorted by detecting the induced magnetic field resulting from the eddy current induced in it. This method is characterized by the following. A magnet is placed near the position in which the induced magnetic field is detected. The attraction of the magnet causes the battery on the conveyor belt to be drawn into the detection region, and the induced magnetic field is detected.

In a further development of the method of sorting batteries according to the invention the method is further characterized by the fact that the induced magnetic field is detected from beside the conveyor belt. The magnet is placed near the detection region so that the battery will be drawn into that position.

In another further development of the method of sorting batteries according to the invention the method is further characterized by the fact that the magnet is a U-shaped magnet. The detection region and the path of transport of the battery are located between the poles of this magnet.

Another refinement of the method of sorting batteries according to the invention is further distinguished by the fact that the induced magnetic field is detected from beside the conveyor belt. The magnet is placed in the detection region below the conveyor belt.

In the embodiments of the invention described above, the battery is drawn toward the detection means by the attractive force of the magnet so that it cannot slip forward or back, left or right in the detection region. The distance between the battery and the detection means is kept fixed so that the transport of the battery is stabilized. This arrangement facilitates achievement of high accuracy of detection.

In one preferred embodiment of the invention, a U-shaped magnet is used. This makes the magnetic field difficult to interrupt and contributes to the achievement of a strong field, resulting in more closely constrained transport of the battery.

In another preferred embodiment of the invention, the magnet is placed under the conveyor belt. The battery is pulled downward against the surface of the belt. The coefficient of friction between the battery and the belt surface is increased, and stable transport of the battery is achieved.

The invention further relates to apparatus for mechanically stabilizing the transport of the battery. One embodiment of the battery sorting apparatus according to the invention has a means for applying an alternating magnetic field containing a number of frequency components to the battery being conveyed continuously on the conveyor belt and a means for detecting the induced magnetic field created by the eddy current induced in the battery. Near the detection means are a belt to stabilize the position of the battery, which is driven by a drive means either to rotate or to move back and forth, and an elevation means to raise and lower the belt. A position-stabilizing mechanism uses the belt to force the battery on the conveyor belt toward the detection means.

Another embodiment of the apparatus for sorting batteries according to the invention has a means for applying an alternating magnetic field containing a number of frequency components to the battery being conveyed continuously on the conveyor belt and a means for detecting the induced magnetic field created by the eddy current induced in the battery. This embodiment is distinguished by the fact that the conveyor belt has ridges at fixed intervals along the length of its surface. In the vicinity of the detection means, the battery can engage in one of the depressions formed between each two ridges.

A further embodiment of the apparatus for sorting batteries according to the invention has a means for applying an alternating magnetic field containing a number of frequency components to the battery being conveyed continuously on the conveyor belt and a means for detecting the induced magnetic field created by the eddy current induced in the battery. This embodiment is distinguished by the fact that the conveyor belt has an undulating surface.

Yet another embodiment of the apparatus for sorting batteries according to the invention also has a means for applying an alternating magnetic field containing a number of frequency components to the battery being conveyed continuously on the conveyor belt and a means for detecting the induced magnetic field created by the eddy current induced in the battery. This embodiment is distinguished by the fact that it has a guide panel near the detection means, which is above the surface of the conveyor belt, to guide the battery on the belt toward the detection means.

In the aforedescribed embodiments of the apparatus according to the invention, a mechanical means is used while the battery is being conveyed to draw the battery toward the detection means. This arrangement allows the transport path of the battery to be constrained without any noise appearing in the signal from the detection means, a problem which occurs when a magnet is used.

A still further embodiment of the apparatus for sorting batteries according to the invention likewise has a means for applying an alternating magnetic field containing a number of frequency components to the battery being conveyed continuously on the conveyor belt and a means for detecting the induced magnetic field created by the eddy current induced in the battery. This embodiment is distinguished by the fact that it has a magnetic belt adjacent to the detection means, on which the battery is conveyed. With this embodiment of the invention, the battery sits on a magnetic belt to which it adheres magnetically. This prevents incidental motion from occurring while the induced magnetic field is being detected, thus assuring stable transport of the battery and maintaining a high accuracy of detection.

Another embodiment of apparatus for sorting batteries according to the invention has a means for applying an alternating magnetic field containing a number of frequency components to the battery being conveyed continuously on the conveyor belt and a means for detecting the induced magnetic field created by the eddy current induced in the battery. At the very start of the conveyor belt, there is a device to control the spacing of the batteries so as to assure an equal interval between the batteries being transported on the belt. This arrangement reduces the likelihood that an adjacent battery will affect the process when a given battery's induced magnetic field is detected and so assures a high accuracy of detection.

DETAILED DESCRIPTION OF PREFERRED EMBODIMENTS

Figure 1:
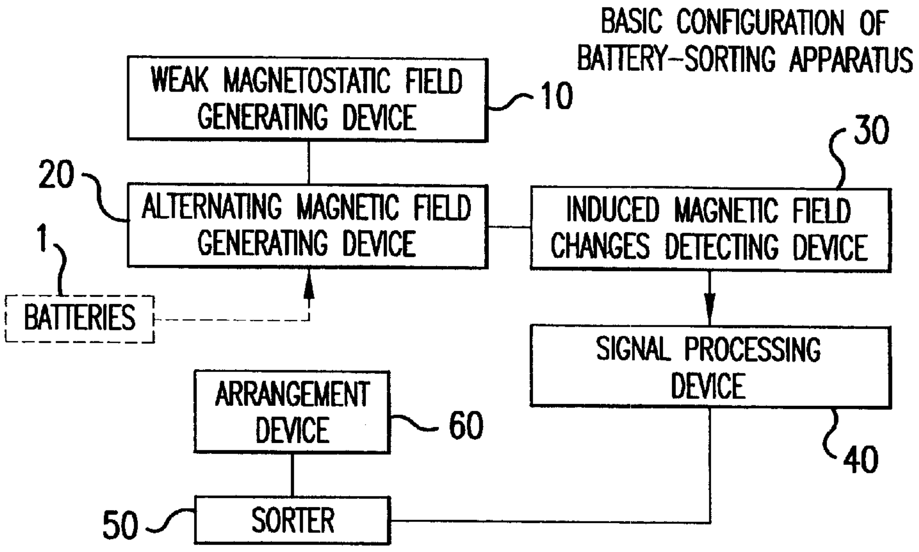
FIG. 1 shows a first example of the basic configuration of a battery-sorting apparatus according to this invention.

In this section a detailed explanation of the invention will be given with reference to preferred embodiments illustrated in the drawings. Whenever the shapes, relative positions and other aspects of the parts described in the embodiments are not clearly defined, the scope of the invention is not limited only to the parts shown, which are meant merely for the purpose of illustration.

Figure 2:
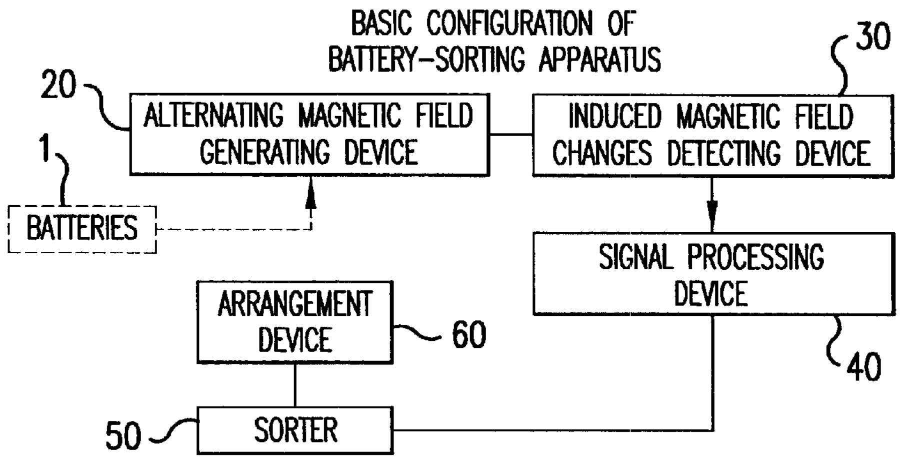
FIG. 2 shows a second example of the basic configuration of a battery-sorting apparatus according to this invention.

FIGS. 1 and 2 show the overall configuration of this invention. The battery-sorting apparatus of this invention comprises a device 10, which generates a weak magnetostatic field; device 20, which generates an alternating magnetic field; device 30, which detects changes in the strength and the biconstituent phases of the induced magnetic field resulting from the eddy current; signal processor 40; device 60, which arranges and transports the batteries; and sorter 50.

Figure 3:
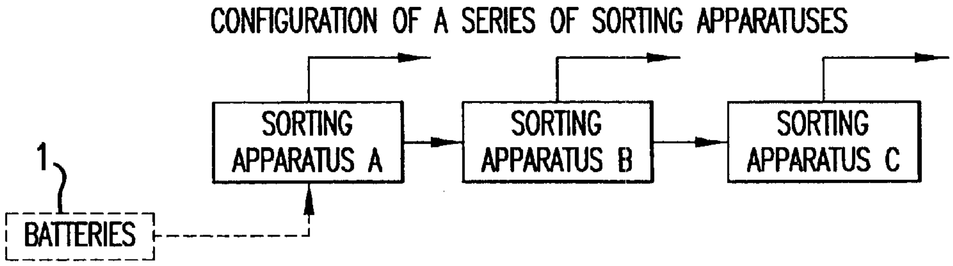
FIG. 3 illustrates how a number of sorting apparatuses might be deployed.

As can be seen in FIG. 3, the battery sorting apparatus in FIGS. 1 and 2 can be connected as a series of sorting apparatuses A, B and C. Each of battery sorting apparatuses A, B and C can separate batteries with a specific composition (alkali, manganese, etc.). Alternatively, a device could be used which extracted batteries of a given size (D, C, AA, etc.). Battery sorting apparatuses A, B and C may be connected in parallel or in series, as needed.

Figure 4:
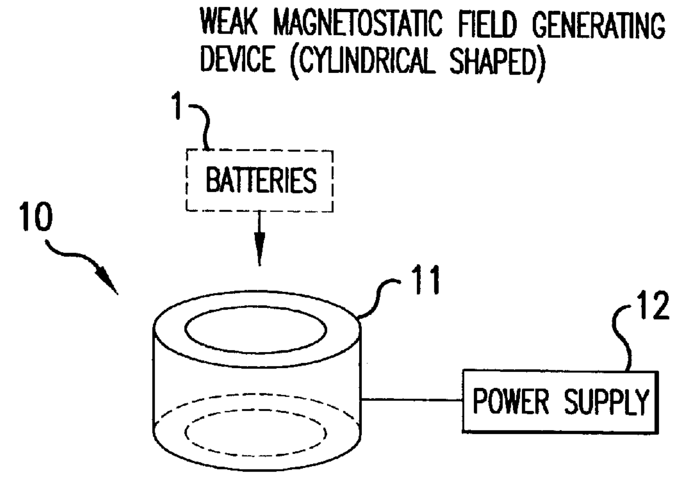
FIG. 4 illustrates a cylindrical excitation coil.
Figure 5:
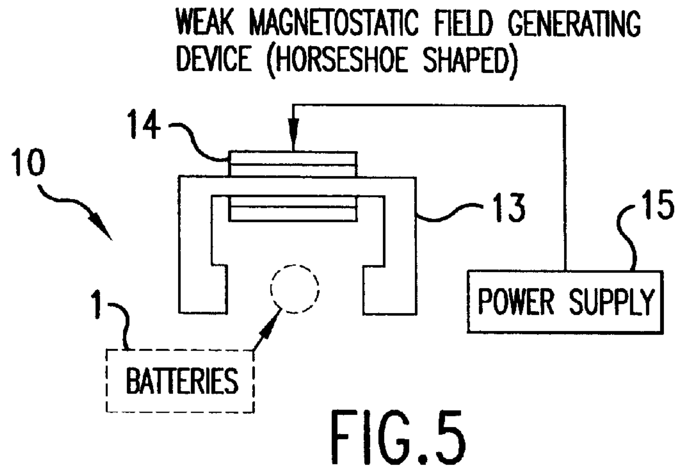
FIG. 5 illustrates a horseshoe-shaped excitation coil.
Figure 6:
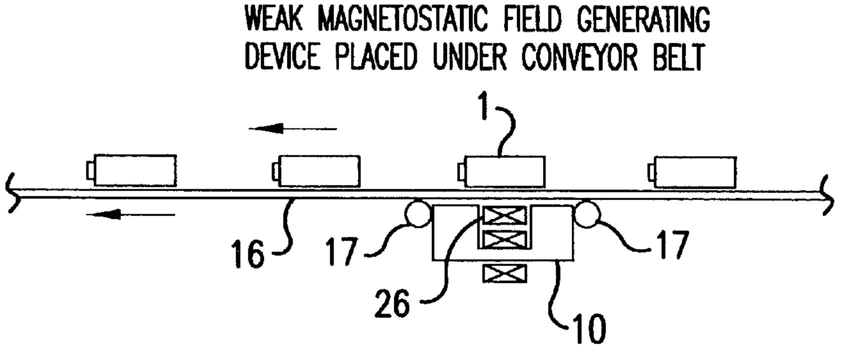
FIG. 6 illustrates a device which generates a weak magnetostatic field being located underneath the conveyor.

Examples of device 10, the device which generates a weak magnetostatic field, are shown in FIGS. 4 through 6. The device 10 used to generate a weak magnetostatic field shown in the drawings comprises an excitation coil for generating the field and a power supply. The coil for generating the field may be cylindrical, horseshoe-shaped or of some other shape.

FIG. 4 shows a power supply 12 connected to a cylindrical coil 11 through which battery 1 will pass.

FIG. 5 shows a power supply 15 connected to a horseshoe-shaped coil comprising a horseshoe-shaped magnetic core 13 around which coil 14 is wound.

FIG. 6 shows a device 10 for generating a weak field which is placed under conveyor belt 16. In this example, battery 1 is held against belt 16 by the magnetic field, thus assuring that it will remain firmly in place. This scheme requires idlers 17 in the vicinity of the field-generating device.

Thus device 10 generates a weak magnetic field and applies a magnetostatic field to battery 1. This minimizes the effect of magnetic changes (relative magnetic permeability) due to metals in the steel jacket on the battery. It also, as will be discussed shortly, makes it easier to determine the contents of the battery.

When batteries 1 which are of the same shape but of different materials are sorted in experiments, differences in the signal which corresponded to different sorts of batteries are produced when the field which is applied in the low-frequency region is at least 0.01 T (Teslas).

According to this principle of detection, data concerning the different materials in the battery can theoretically be collected by using a stronger magnetostatic field and magnetically saturating the jacket. For this purpose, the magnetostatic field must be at least 1 T.

However, if a strong magnetostatic field is applied, an extremely large magnetic force will operate on battery 1. This will make it difficult to transport the batteries at a rapid speed through the device which generates the field. For example, if the magnetostatic field which is applied is 0.07 T or greater, a AA battery will be attracted, and the belt transport shown in FIG. 6 will become problematical. With fields of 0.3 T or more, D and C batteries will experience difficulties in getting through the field. Applying a weak magnetostatic field, then, will assure that battery 1 can be transported at a high speed.

If the magnetostatic field is generated by the horseshoe-shaped coil shown in FIG. 5, the configuration of the conveyor can be simplified. This scheme can be used to separate batteries of a wide variety of shapes and sizes.

Device 10 to generate a weak magnetostatic field is not limited to an electromagnet. A permanent magnet could also be employed for this purpose.

Figure 7:
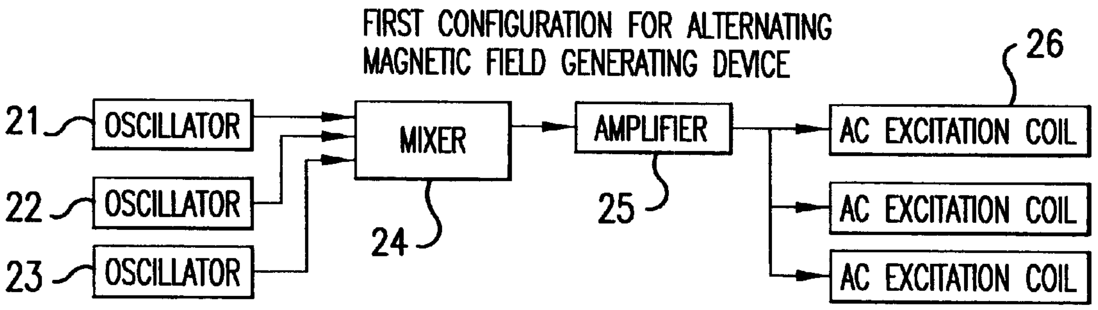
FIG. 7 depicts an example of a device for generating an alternating magnetic field.
Figure 8:
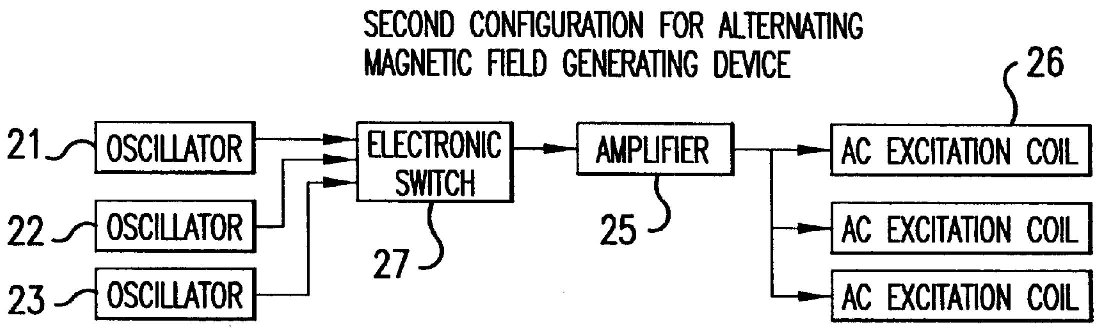
FIG. 8 depicts another example of a device for generating an alternating magnetic field.

Examples of device 20, the device used to generate an alternating magnetic field, are shown in FIGS. 7 and 8.

The generating device 20 shown in FIG. 7 comprises oscillators 21, 22 and 23; mixer 24; amplifier 25; and one or more AC excitation coils 26.

The generating device 20 shown in FIG. 8 comprises oscillators 21, 22 and 23; electronic switch 27; amplifier 25; and one or more AC excitation coils 26.

The oscillators 21, 22 and 23 should produce signals at low, medium and high frequencies, respectively. When the signals from the oscillators 21, 22 and 23 are mixed by mixer 24, the response speed will be faster than when they are switched by electronic switch 27.

If a field is applied to batteries of different sizes by the same AC excitation coil, the efficiency will suffer because of the distance being increased with smaller batteries. For this reason it is more effective to use a combination of excitation coils 26 as shown in FIGS. 7 and 8. For example, one coil might be used for small batteries and another for large ones.

The AC excitation coils can also be placed under conveyor belt 16 as shown in FIG. 6. Examples of the AC excitation coil 26 are shown in FIGS. 9 and 10.

Figure 9:
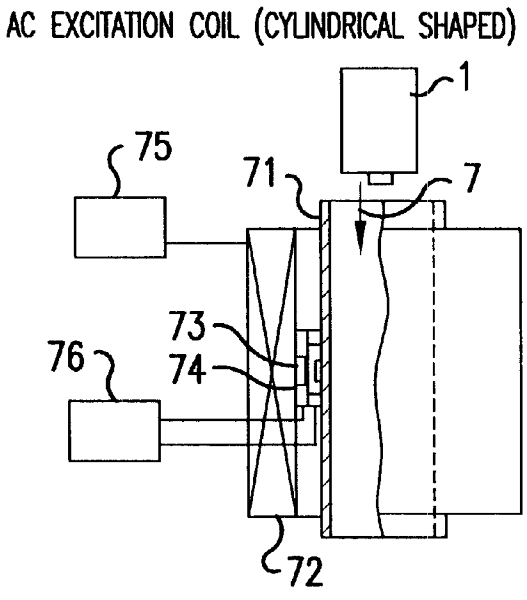
FIG. 9 illustrates a cylindrical AC excitation coil.

FIG. 9 shows a cylindrical AC excitation coil. A coil to generate a weak magnetostatic field is combined with a coil to detect changes in the induced magnetic field. Battery 1 is dropped into cylindrical guide 71 and moved forward. Cylindrical coil 72, which generates a magnetostatic field, is placed outside guide 71. Between guide 71 and coil 72 are cylindrical coil 73, which excites an alternating current, and coil 74, which detects changes in the induced magnetic field. The generating coil 72 is connected to DC power supply 75. Excitation coil 73 is connected to the amplifier 25 for the device to generate an alternating magnetic field. Detector coil 74 is connected to the amplifier 32 for the device to detect changes in the induced magnetic field which is shown in FIG. 1. Thus while coil 72 applies a relatively weak magnetostatic field to the battery 1 which drops into guide 71, coil 73 applies an alternating magnetic field. Coil 74 detects the changes in the induced magnetic field created by the eddy current induced in battery 1 by the alternating magnetic field.

Figure 10A:
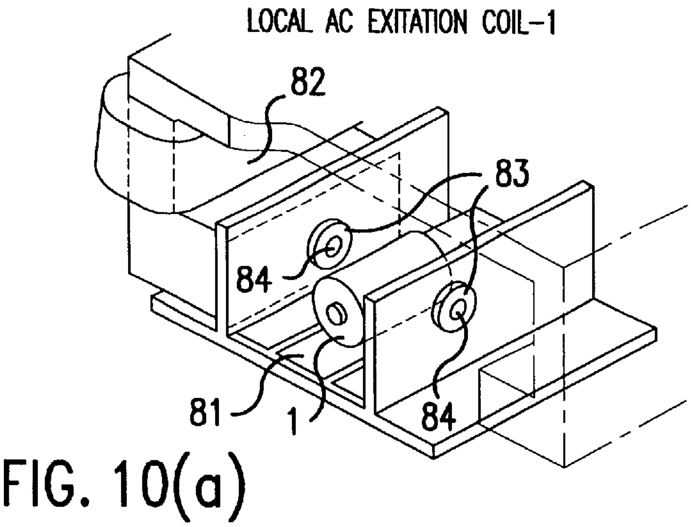
FIG. 10 illustrates the use of local AC excitation coils.
Figure 10B:
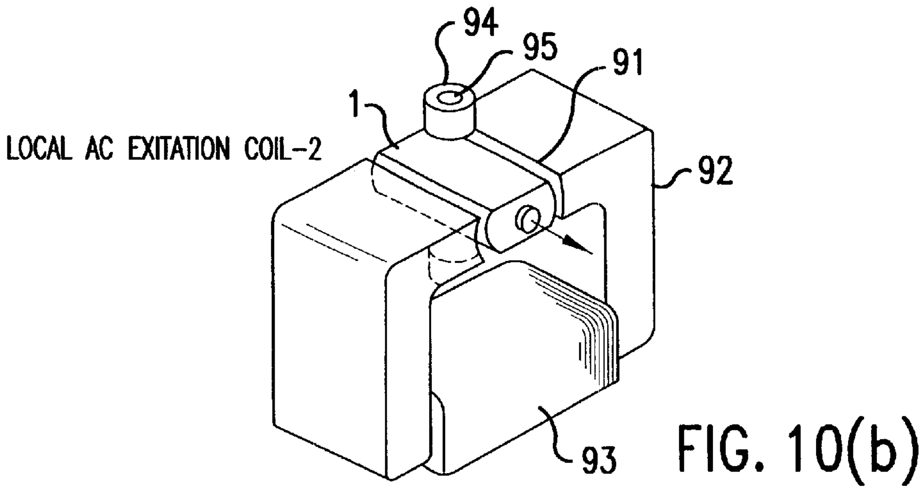

FIGS. 10(*a*) and (*b*) show local AC excitation coils. The drawings show them used with devices to generate a weak magnetostatic field.

As is shown in FIG. 10(*a*), when battery 1 is brought in on conveyor belt 81, generator coil 82 for the magnetostatic field is placed so that its magnetic flux penetrates battery 1 laterally. Local excitation coils 83, which are excited by an alternating current, are placed facing the interior of generator coil 82. Thus as generator coil 82 applies a weak magnetostatic field to the battery 1 being transported on conveyor belt 81, local AC excitation coils 83 can apply an alternating magnetic field to the battery. Detector coils 84 can then detect the changes in the local field induced in battery 1 by the eddy current created by the alternating field.

As is shown in FIG. 10(*b*), generator coil 93, the coil which generates a magnetostatic field, is wound around horseshoe-shaped magnet 92, and battery 1 is placed in its gap. Local AC excitation coil 94 is placed orthogonal to battery 1. Thus as generator coil 93 applies a weak magnetostatic field to the battery 1 being transported, local AC excitation coil 94 can apply an alternating magnetic field to the battery 1. Detector coil 95 can then detect the changes in the local field induced in battery 1 by the eddy current created by the alternating field.

The magnetic field generated by coil 93 in FIG. 10(*b*) concentrates the magnetic flux outside the battery in a location facing local AC excitation coil 94. As the magnetization increases, the effect of the eddy current induced in battery 1 will increasingly be experienced in the battery's interior. With this sort of device 20 to generate an alternating magnetic field, AC excitation coil 26 shown in FIG. 7 can apply a magnetic field which generates an eddy current in the metals constituting the battery. The phase-shift and strength of the eddy current which flows in the metals constituting battery 1 will vary according to the electromagnetic characteristics of the metals and the AC frequency. If fields of different frequencies are combined and applied simultaneously, a variety of data can be obtained at one time. This will improve the responsiveness and allow the batteries to be conveyed at a high speed.

In this embodiment, oscillators 21, 22 and 23 apply fields of three separate frequency components simultaneously. Using a high (over 100 kHz), medium (10 to 40 kHz) and low (0.5 to 2 kHz) frequency allows us to obtain different detection output at three different frequencies for every battery. If a number of kinds of detection signals are obtained, using a combination of these signals will improve the accuracy with which the batteries are sorted.

Generating an eddy current by using the local AC excitation coils 83 and 94 which are shown in FIG. 10 allows the configuration of the conveyor to be simplified. If a number of local AC excitation coils of different shapes and sizes are used either coaxially or along the path of transport, the device can be used to sort a wide variety of shapes and sizes of batteries without sacrificing sorting accuracy.

Figure 11:
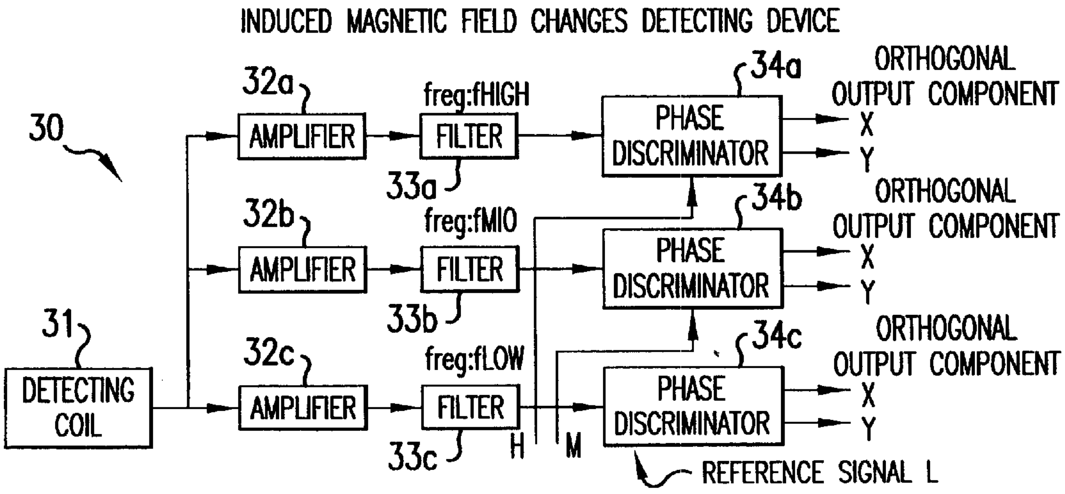
FIG. 11 shows the basic configuration of a device for detecting changes in the induced magnetic field.

The basic configuration of device 30 for detecting changes in the induced magnetic field is shown in FIG. 11. As can be seen in this drawing, detector 30 comprises coil 31, which detects changes in the induced magnetic field (hereafter simply called "detecting coil 31"); amplifiers 32*a*, 32*b* and 32*c*; filters 33*a*, 33*b* and 33*c*; and phase discriminators 34*a*, 34*b* and 34*c*. Detecting coil 31 may comprise separate coils for small and large batteries, and it may be placed under the conveyor belt.

Although the apparatus would be functional without filters 33*a*, 33*b* and 33*c*, it functions more efficiently if they are used. Each selects one of three frequencies, either high, medium or low, which correspond to the frequencies of the oscillators in the device to generate an alternating field.

Phase discriminators 34*a*, 34*b* and 34*c* separate the data in the signal output by the detecting coil, namely the change in the field strength (A), and the change in phase ($\theta$) into its orthogonal components of $X=A\cos\theta$, and $Y=A\sin\theta$.

Figure 12:
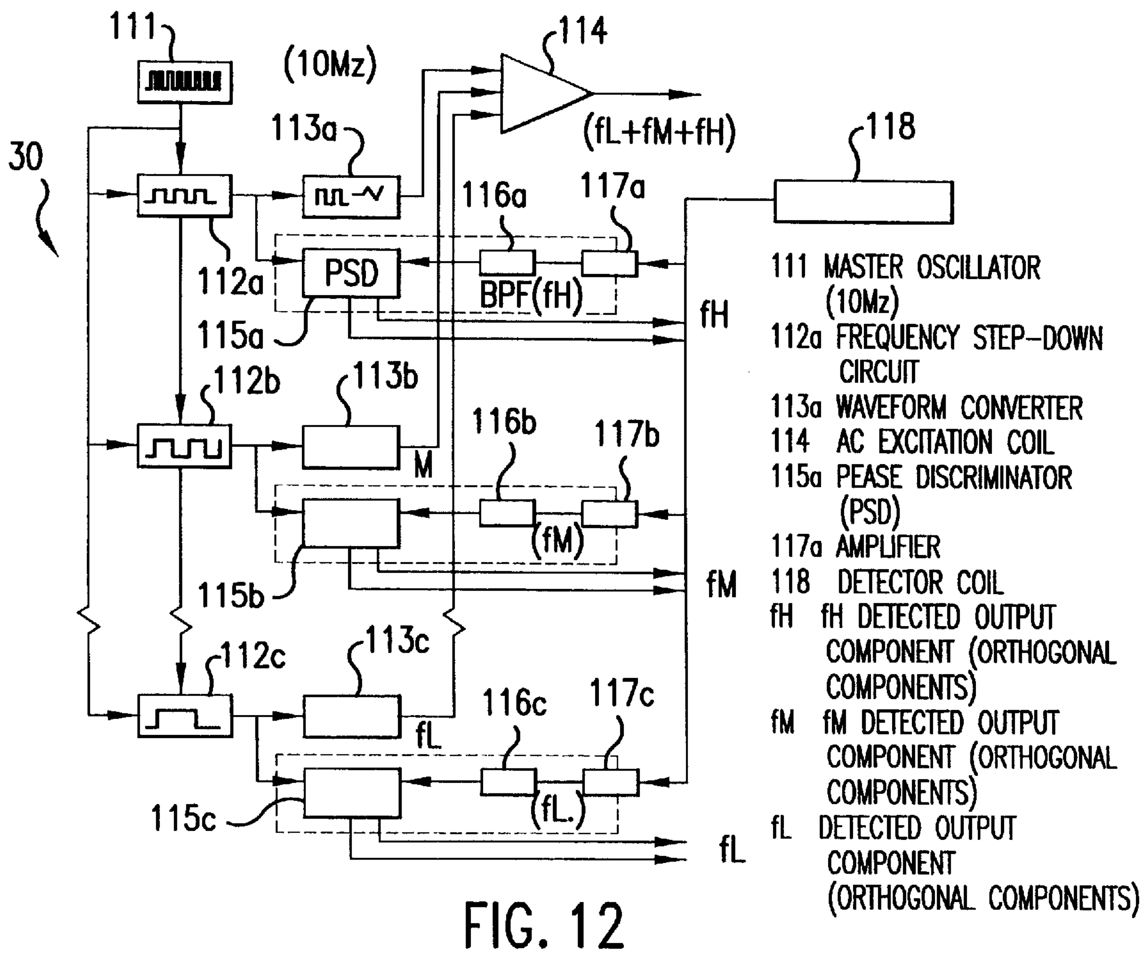
FIG. 12 shows an actual configuration of a device for detecting changes in the induced magnetic field.

An example of the actual configuration of device 30 to detect changes in the induced magnetic field is shown in FIG. 12. In this example, the device also generates an alternating magnetic field. As can be seen in FIG. 12, the short-wave (10 MHz) signal from master oscillator circuit 111 is converted to three different frequencies, fH, fM and fL, by frequency step-down circuits 112*a*, 112*b* and 112*c*. The three frequencies are converted to sine waves by waveform converters 113*a*, 113*b* and 113*c*. They are mixed by mixer and power amplifier 114, amplified, and output to the AC excitation coil (not shown).

The signals detected by detector coil 118 are amplified by amplifiers 117*a*, 117*b* and 117*c*. They are then separated into frequencies fH, fM and fL by band pass filters (BPF) 116*a*, 116*b* and 116*c*. Phase discriminators (PSD) 115*a*, 115*b* and 115*c* detect the orthogonal components with respect to reference signals from frequency step-down circuits 112*a*, 112*b* and 112*c* for each of frequencies fH, fM and fL, and output them. In this way detector 30 can detect changes in the induced magnetic field generated by eddy current in battery 1.

If the excitation coil is excited at different frequencies, the output from those frequencies can be detected simultaneously. This improves the responsiveness of the apparatus, and the fact that the signals are simultaneous makes it possible to simplify the configuration of the signal processor.

If a local detecting coil of the type shown in FIG. 10(*b*) is used, the device will be applicable for separating a wide variety of sizes and shapes, both flat and round.

If a number of local detecting coils are lined up along the battery's path, and the output from each detected during operation, the effect of shifts in the battery's position as it is transported can be mitigated and the accuracy of sorting improved.

When phase discriminators 34a, 34b and 34c take the orthogonal components of the output signals, the quantity of data is increased (including data relating to both phase and strength), and the accuracy of sorting is improved. In other words, if the orthogonal components of signals at various frequencies are output simultaneously, the quantity of data available for sorting the battery is vastly increased, resulting in more accurate sorting.

Figure 13:
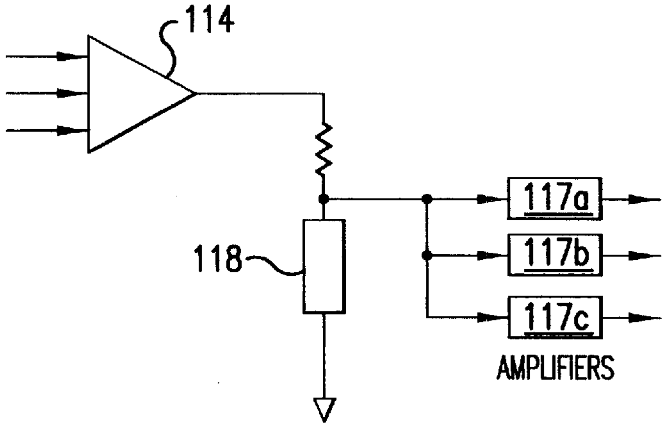
FIG. 13 shows some of the elements in a signal processing device.

The detecting coil, which can be seen in FIGS. 9 and 10, is mounted so as to be coaxial with the AC excitation coil. However, a self-induction coil can be used to achieve the same effect. In this case, the detecting coil and the AC excitation coil would be a single entity, and, as is shown in FIG. 13, only one portion of the circuit configuration would need to be modified.

Figure 14:
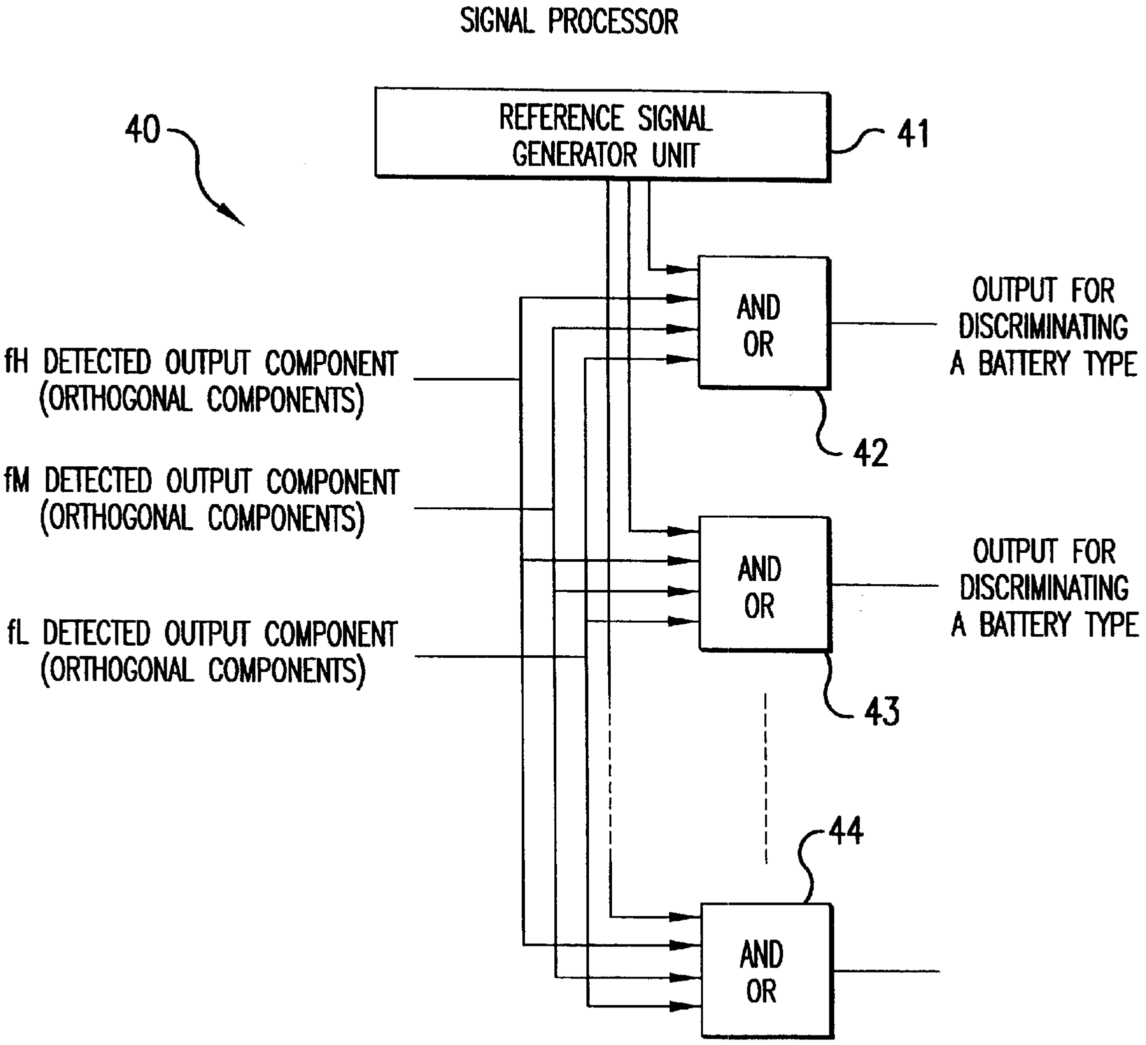
FIG. 14 shows the basic configuration of a signal processing device.

Signal processor 40, which is shown in FIG. 14, comprises device 41, which generates a reference signal, and AND/OR circuits 42, 43 and 44. AND/OR circuits 42, 43 and 44 perform "AND" and "OR" operations on the orthogonal component outputs for detection signals associated with the frequencies fH, fM and fL and the outputs of reference signal generator unit 41, which outputs previously determined values for these signals. In this way output is obtained which discriminates among various types of batteries.

Figure 15:
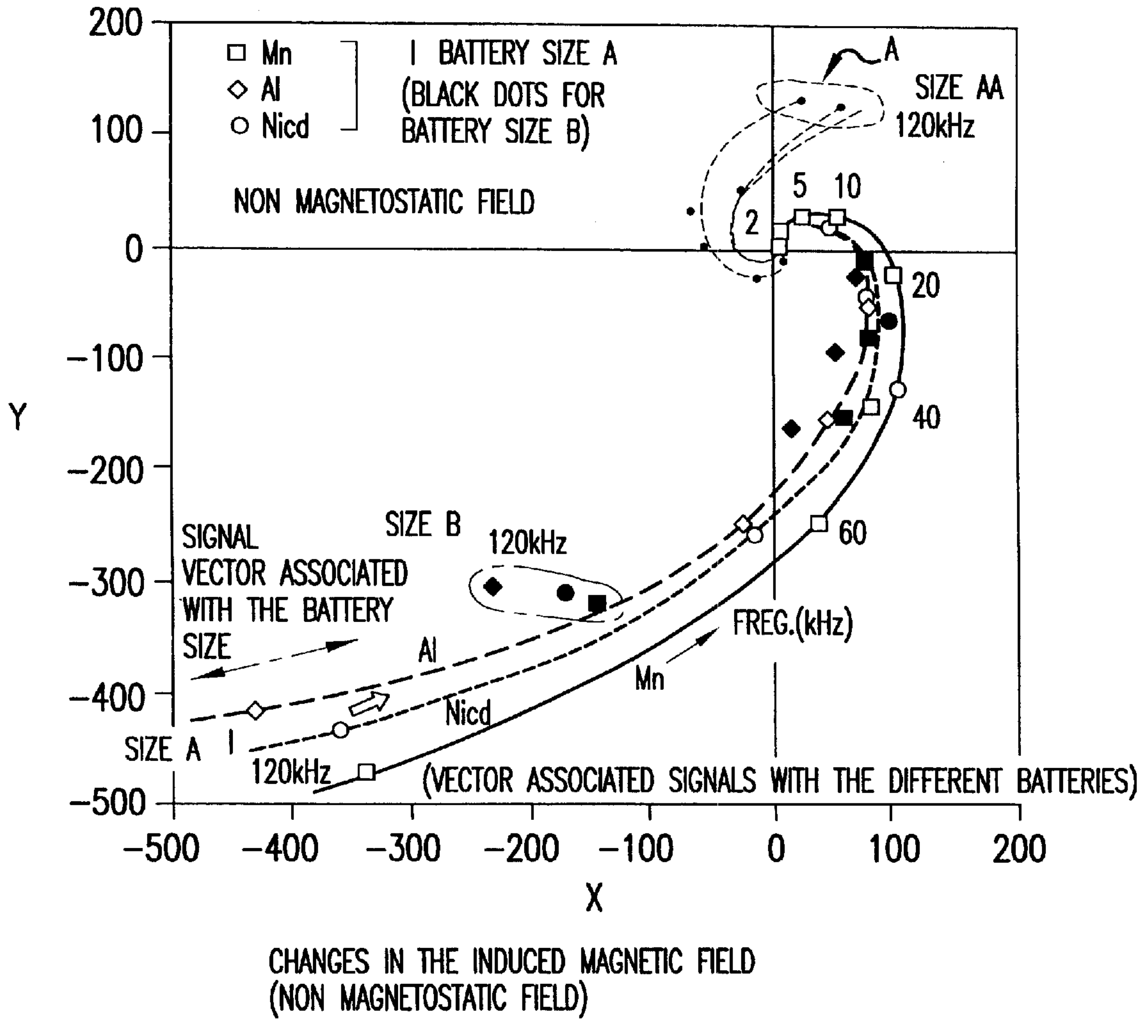
FIG. 15 is a graph of battery detection output in the absence of a magnetostatic field.
Figure 16:
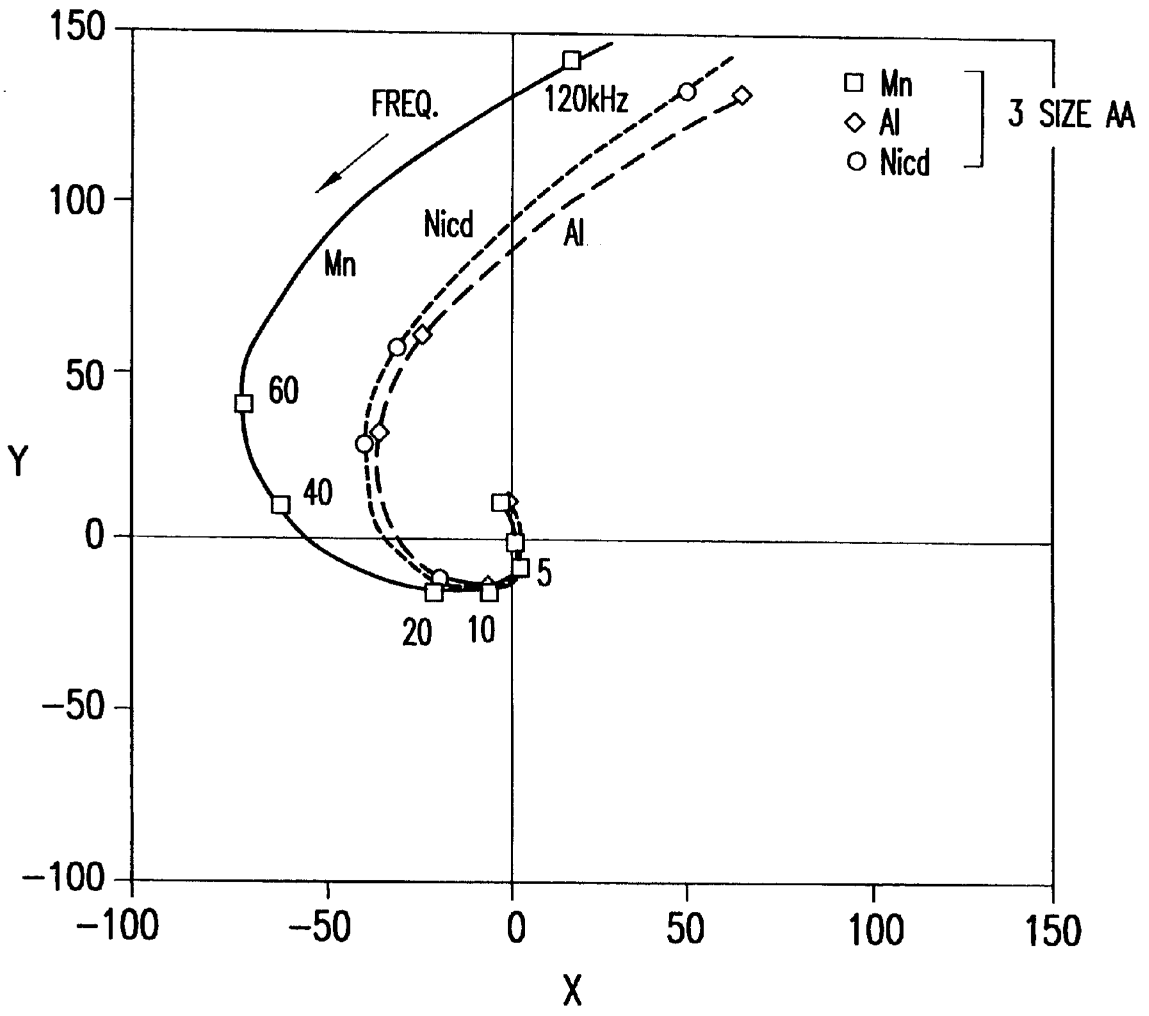
FIG. 16 is an enlarged graph of portion A in FIG. 15.

For example, changes in the detection output for a battery in the absence of a magnetostatic field are shown in FIGS. 15 and 16. In both figures, the orthogonal components of the output signal from the detecting coil for each frequency are plotted as 2-dimensional coordinates on an X-Y axis. As can be seen in both graphs, the size and direction of the vector representing the detection signal will have characteristic values depending on the composition of the battery (whether it consists of manganese (Mn), alkali (Alk), nickel-cadmium (NiCd), etc.) and its size (whether it is D, C, etc.). One can see in the graphs that data associated with it the battery's size are intermingled with data associated with its composition.

Figure 17:
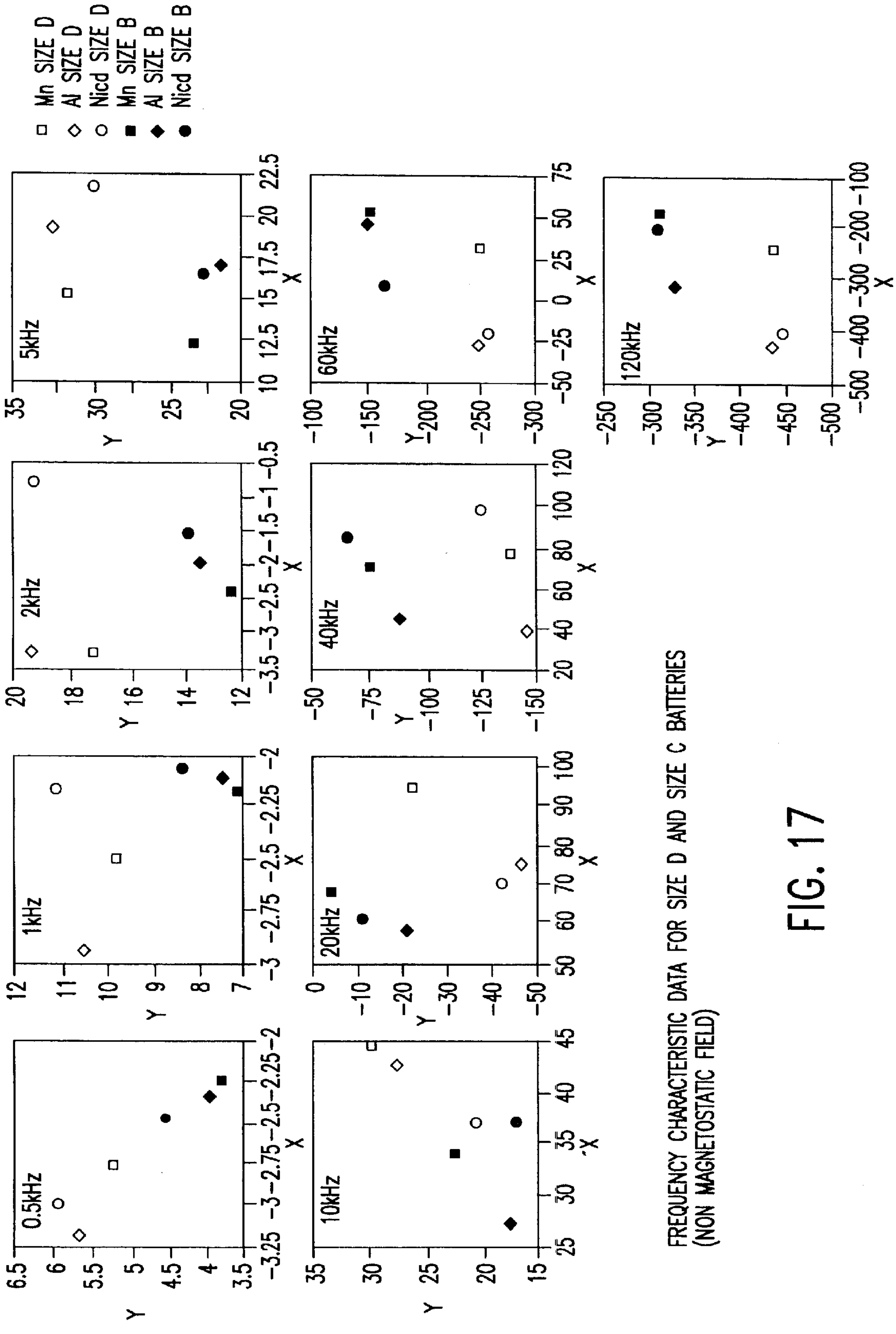
FIG. 17 is a graph of the frequency characteristics of size C and size D batteries in the battery detection output.
Figure 18:
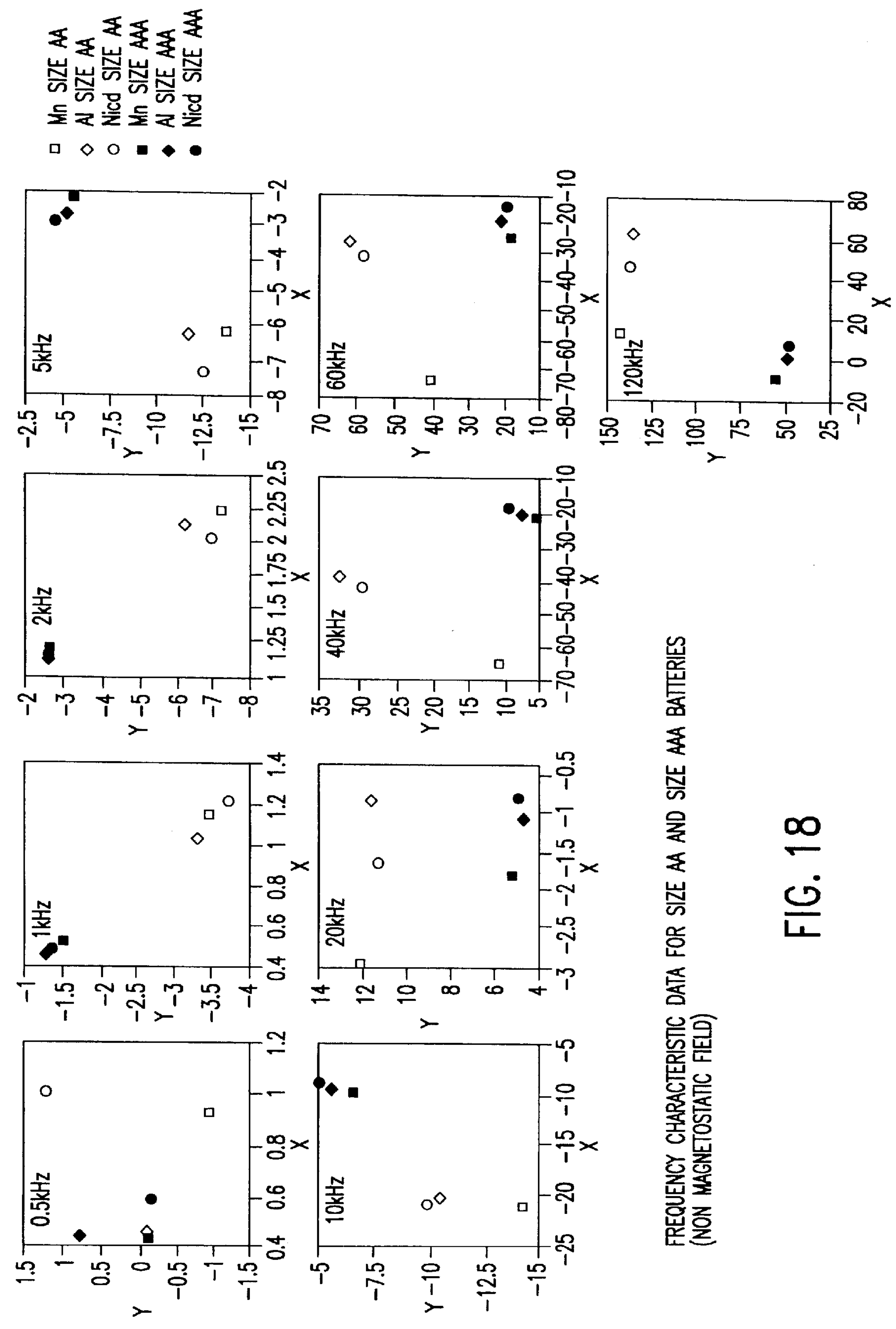
FIG. 18 is a graph of the frequency characteristics of size AA batteries in the battery detection output.
Figure 19:
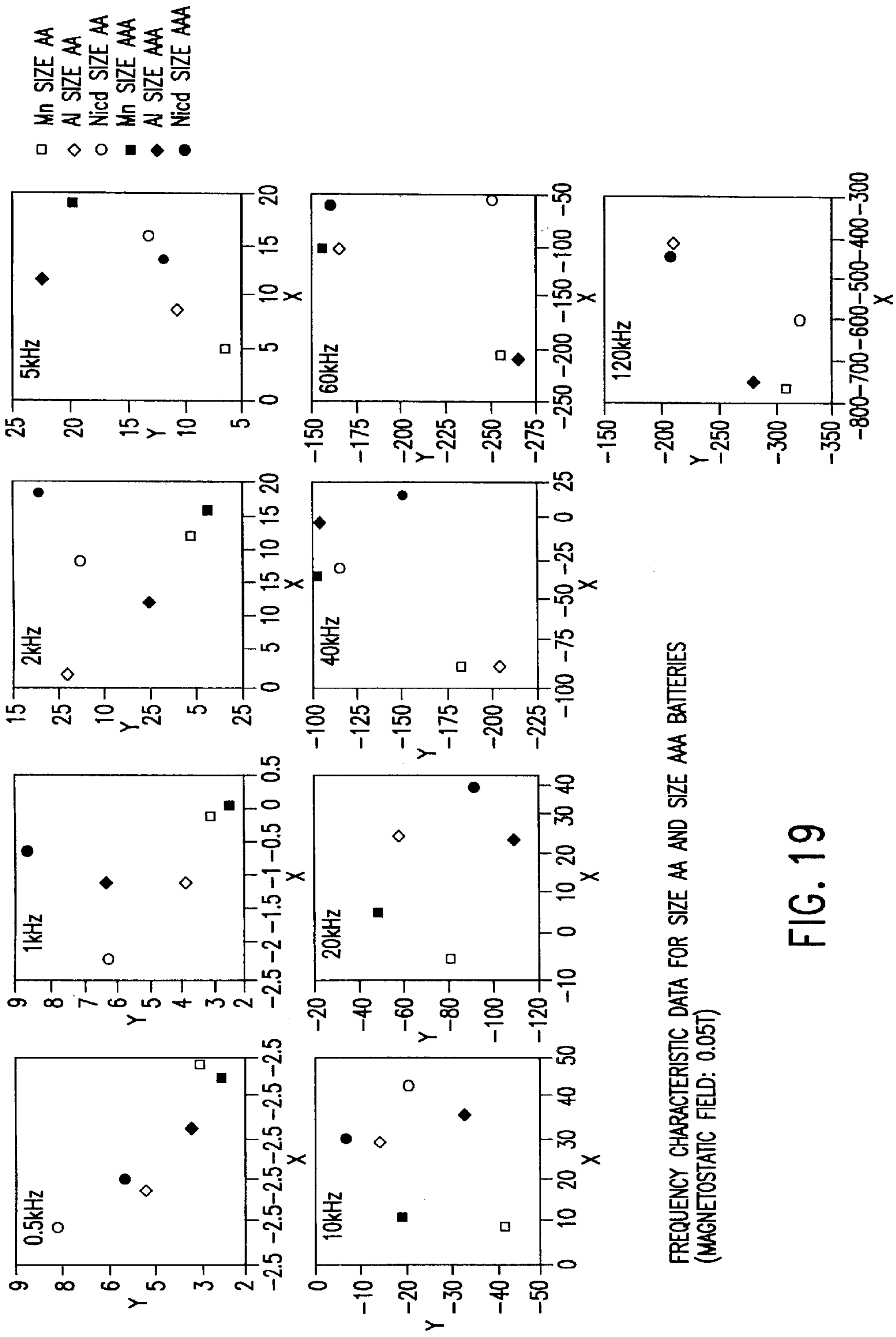
FIG. 19 is a graph of the frequency characteristics in the battery detection output when a magnetostatic field is applied.

The size and direction of the vector representing the orthogonal component output depend on the frequency of the alternating field applied to the battery. When detection signals of appropriate frequencies are combined and "AND" and "OR" operations are performed, it becomes possible to sort the battery by its main components independently of effects from the size of the battery. The orthogonal outputs for each frequency are plotted as 2-dimensional coordinates on the X-Y axis in FIGS. 17 through 19. FIG. 17 represents frequency characteristic data for size D and size C batteries in the absence of a magnetostatic field. FIG. 18 represents data for size AA and size AAA batteries in the absence of a magnetostatic field. FIG. 19 represents data for size AA and size AAA batteries in the presence of a magnetostatic field of a strength of 0.05 T.

Figure 20:
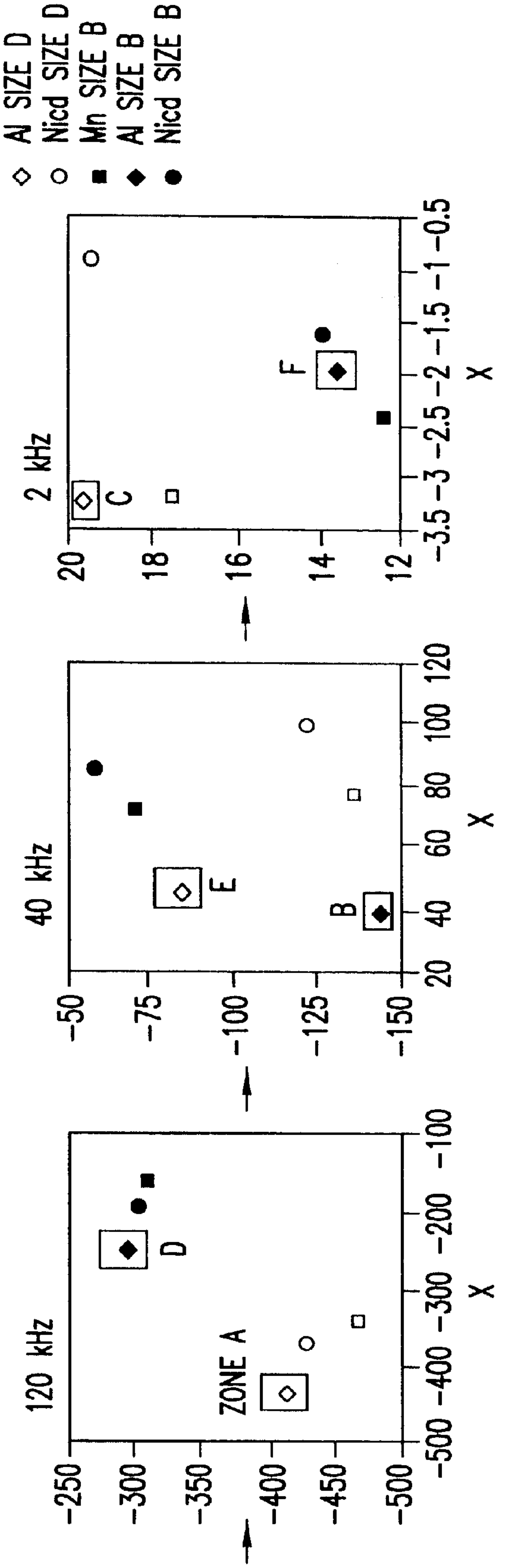
FIG. 20 illustrates the principle used in this battery-sorting scheme.

The method of discriminating types of batteries by combining appropriate frequencies is illustrated in FIG. 20 using the example of how to discriminate an alkaline battery. As is shown in the graph, if the frequency of the alternating field is 120 kHz, and there is no magnetostatic field, a D-size alkaline battery will appear in Zone A, and a C-size alkaline battery will appear in Zone D. At 40 kHz, a D-size alkaline battery will appear in Zone B, and a C-size alkaline battery will appear in Zone E. At 2 kHz, a D-size alkaline battery will appear in Zone C, and a C-size alkaline battery will appear in Zone F. Thus to sort alkaline batteries regardless of size, one would select those whose output signals fell simultaneously into either zone A or D, and either zone E or B, and either zone C or F. Similar zones can be established for each composition of battery, and "AND" and "OR" operations can be used to discriminate whether the signals fall into each of the zones.

As can be appreciated by the frequency separations in FIGS. 18 and 19, applying a magnetostatic field results in the data points plotted for the orthogonal component output being more separated for each type of battery than when the field is not applied. In other words, applying a magnetic field causes the effects of the main components of the battery to be expressed strongly. Their characteristics are separated more clearly, and the battery can be sorted more readily. For this reason, Zones A through F in FIG. 20 can be smaller when a magnetostatic field is applied than when it is not. In this embodiment, then, the orthogonal component output is plotted as 2-dimensional coordinates. Zones are established by noting where the main components of the battery show up. "AND" and "OR" operations are performed to determine whether the detected signal belongs in each zone. In this way the main components of the battery can be discriminated.

Signal processor 40 is not limited to the unit pictured in FIG. 14. It could also comprise a multiple-input "AND" circuit, a multiple-input "OR" circuit, and a circuit to generate a reference voltage.

Another alternative would be to use multiple A/D devices, a digital signal processor, and software which could execute the discrimination protocol described above.

Device 60 for arranging and conveying the batteries may be a combination of a rotating type and a straight line type conveyor device. Device 60 could also comprise a control mechanism to space the batteries at regular intervals as well as a rotating type and a straight line type conveyor device. If the batteries are arranged at fixed intervals to be conveyed to the sorting device by a mechanism to stabilize their positions and thereby prevent the preceeding or following battery from interfering with the one being sorted, the accuracy of sorting will improve.

Figure 21:
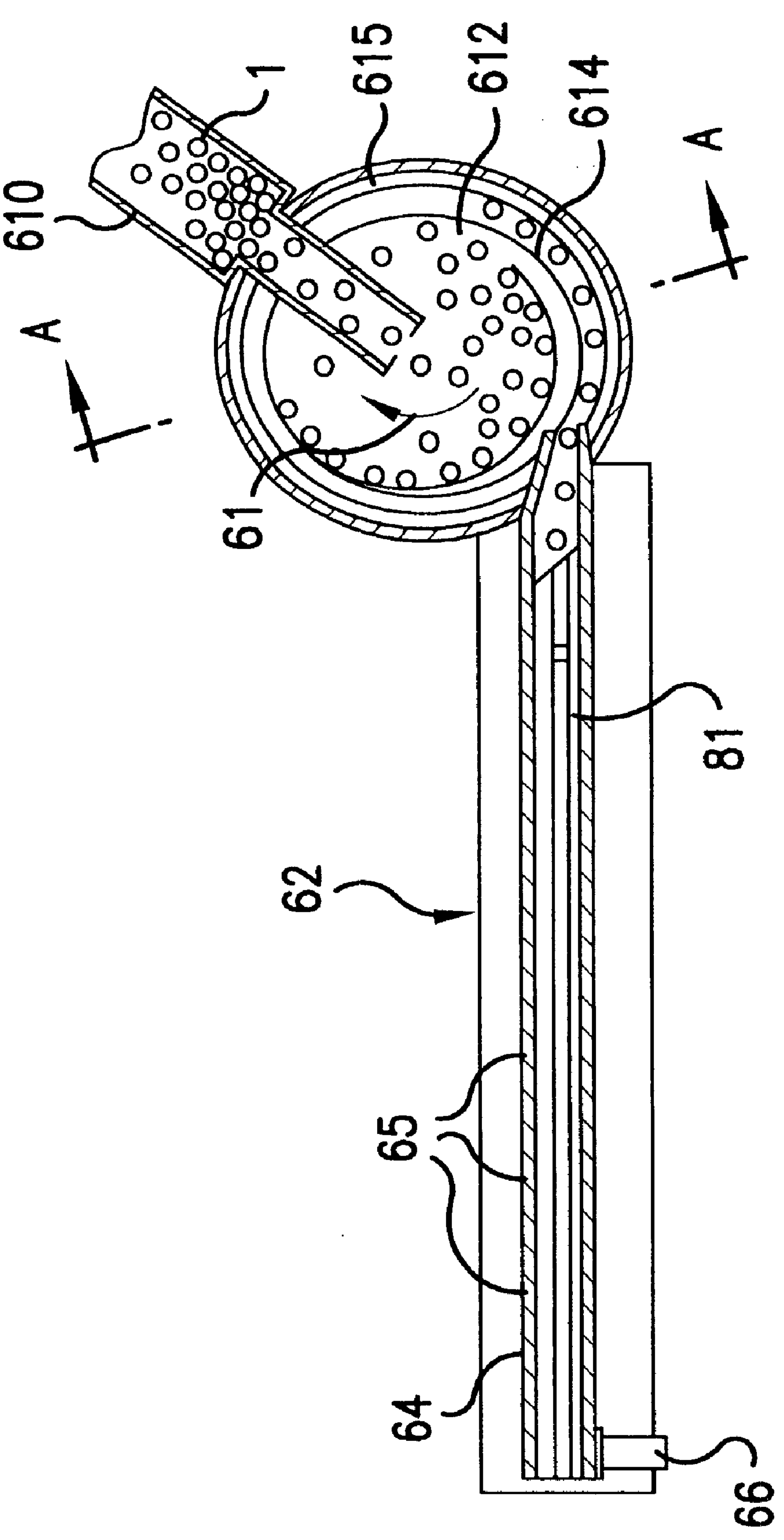
FIG. 21 is a plan view of a concrete example of a device for arranging and transporting the batteries.

One example of an actual arranging and conveying device 60 to arrange and convey the batteries is shown in FIG. 21. As can be seen in the drawing, this arranging and conveying device 60 comprises a rotary-type conveyor device 61 and a straight line-type conveyor device 62. Rotary conveyor 61 uses centrifugal force to arrange the batteries 1 which enter the cylinder through inlet 610 and send them to linear conveyor 62. Linear conveyor 62 loads the arrayed batteries 1 on conveyor belt 81 and carries them forward. Spacing control device 620 shown in FIG. 38 maintains the batteries at regular intervals and loads them on conveyor belt 81.

Figure 22:
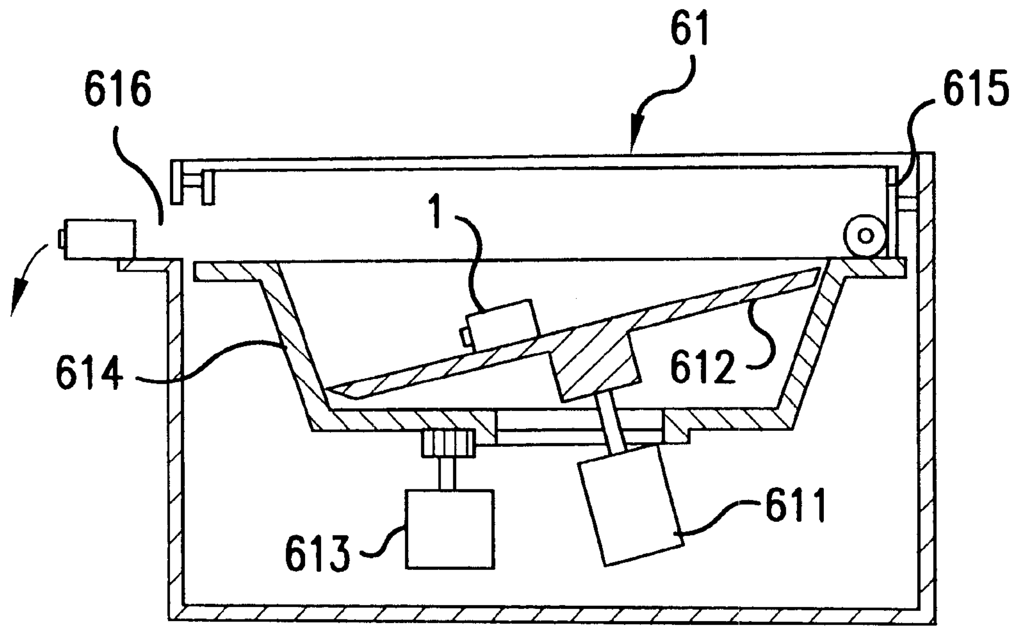
FIG. 22 is a cross section of a rotary conveyor.

In the course of its travel on conveyor belt 81, which will be discussed shortly, battery 1 is deposited via one of outlets 65, which are provided for all types of batteries, between guide walls 64 on either side of conveyor belt 81. As is shown in FIG. 22, revolving conveyor 61 has an oblique disk 612 and a horizontal disk 614 which surrounds the oblique disk. Disks 612 and 614 rotate on an axis which passes through both of them. The outer disk, 614, rotates faster than the inner disk. Disk 612 is rotated by motor 611. Disk 614 is rotated by motor 613, which is on its periphery.

Figure 38:
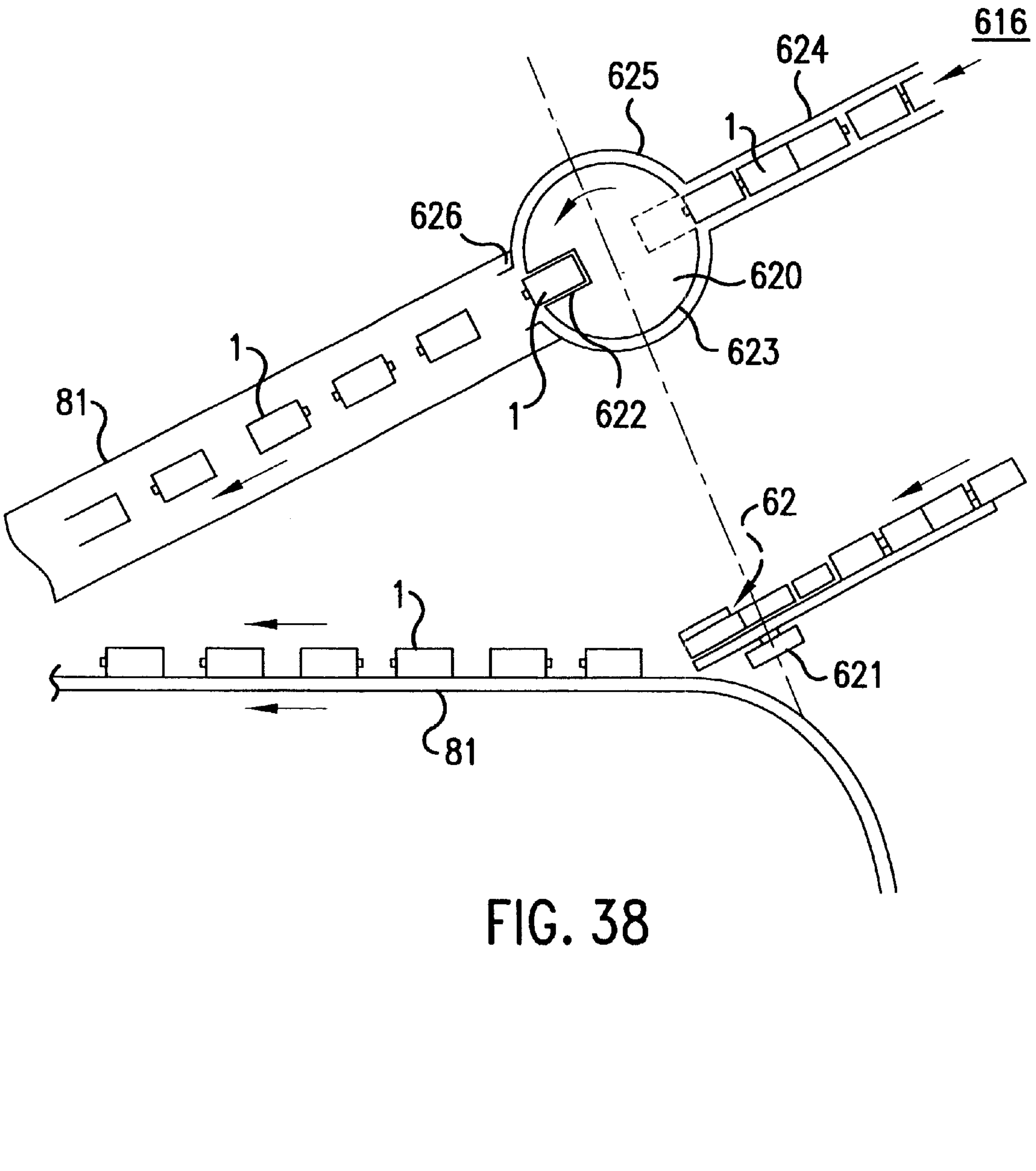
FIG. 38 shows the main elements of a preferred embodiment of a control device for arranging the batteries at equal intervals.

The battery 1 which enters the conveyor through inlet 610 is loaded on disk 612, is conveyed to the highest portion of the periphery of the disk by centrifugal force, and there exits the disk. The battery 1 which has exited disk 612 is loaded onto the peripheral surface of outer disk 614. Centrifugal force lines it up against guide wall 615 as it travels. Batteries 1 are supplied continuously to spacing control device 620 through outlets 616 provided in guide wall 615. Spacing control device 620 is rotated by motor 621 as shown in FIG. 38. It consists of spacing control disk 623, which has spaces on its periphery into which batteries 1 can fit; linear guide 624, which supplies batteries 1 to spacing control disk 623; and circular guide 625, which is on the periphery of spacing control disk 623. The batteries 1 which are continuously supplied from rotary conveyor 61 are continuously arranged along the inside of linear guide 624 and forced onto spacing control disk 623. The batteries 1 which are forced onto spacing control disk 623 move into storage space 622, which is along the periphery of the disk. When, in the course of their rotation, they reach an outlet 626, the force of a quantity of air blown from air nozzle 627 supplies them to conveyor belt 81. By varying the rpm of rotary disk 623, batteries 1 can be supplied to conveyor belt 81 at different intervals. The use of this spacing scheme will reduce any effect of adjacent batteries when battery 1 goes past coil 84, the coil which detects changes in the induced magnetic field. This will improve the sorting accuracy.

Figure 23:
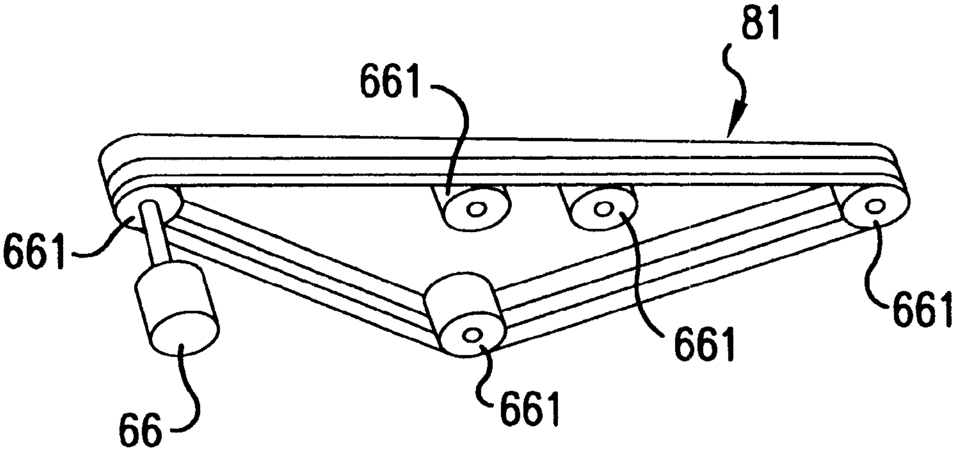
FIG. 23 shows the arrangement of the conveyor belt.
Figure 24:
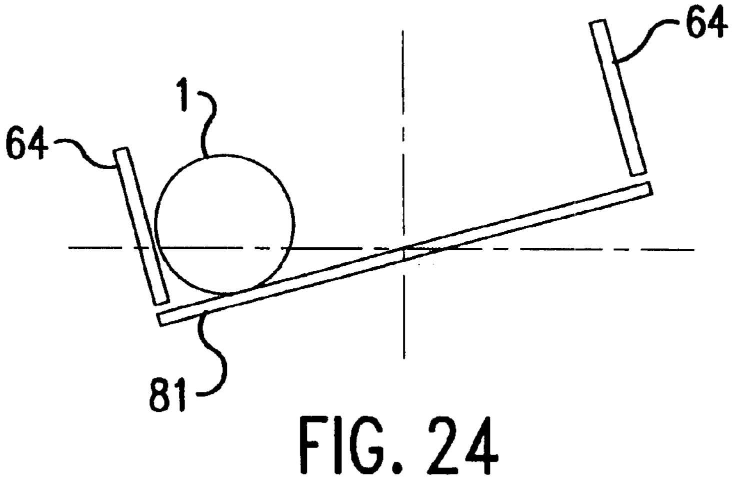
FIG. 24 illustrates how the conveyor belt is installed.

As can be seen in FIG. 23, conveyor belt 81 is operated by drive motor 66 and a series of pulleys 661. As can be seen in FIG. 24, conveyor belt 81 is mounted obliquely with respect to a horizontal surface. This stabilizes the position of battery 1 along the width of conveyor belt 81 as it is conveyed.

Figure 25:
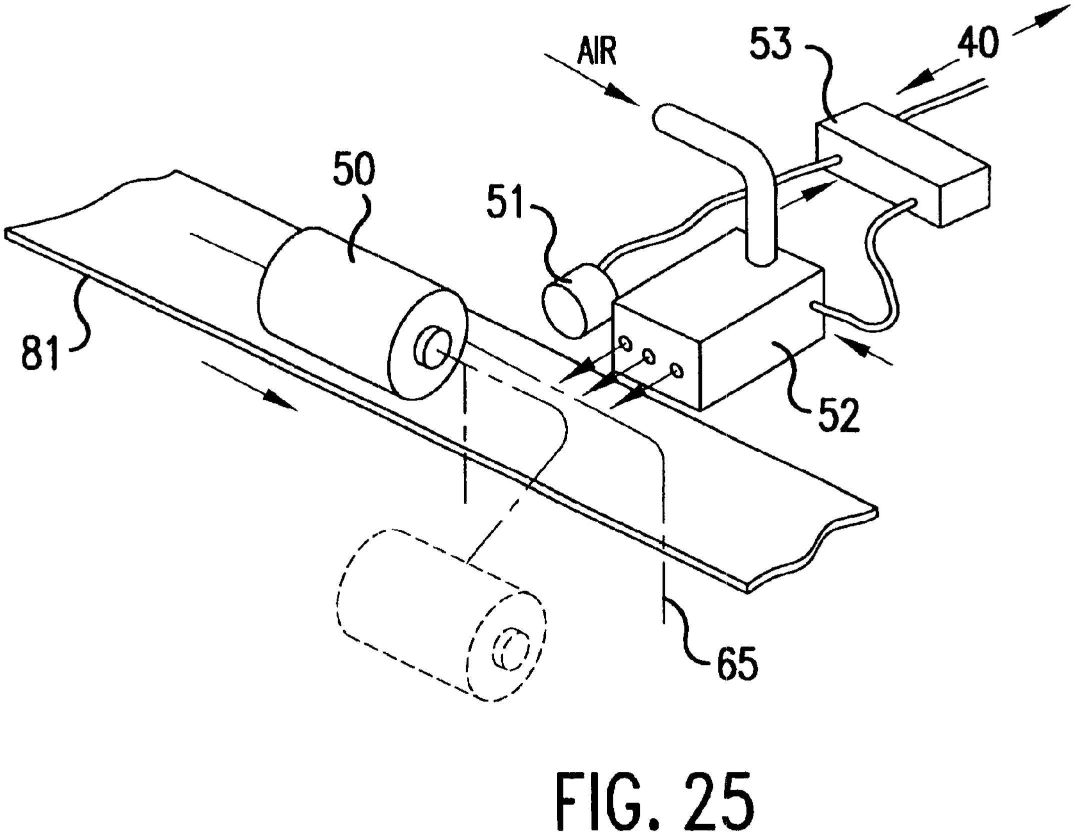
FIG. 25 shows the configuration of a single unit of a sorting apparatus.

Sorting device 50 may comprise a number of air nozzles, buckets, and electromagnetic solenoids. It may alternatively comprise a number of sorting arms and an electromagnetic solenoid. As can be seen in FIG. 25, a single unit of sorting device 50 is an element consisting of proximity sensor 51 and electromagnetic valve 52. The entire apparatus would comprise a number of devices which corresponds to the number of types of batteries to be sorted.

Proximity sensor 51 detects the passage of the battery being transported on conveyor belt 81. When it receives a signal which indicates what type of battery this is, based on the output of proximity sensor 51 and processing executed by signal processor 40, electromagnetic valve 52 directs several high-speed air streams at battery 1. Thus when a battery 1 being transported by conveyor belt 81 is detected by proximity sensor 51 and electromagnetic valve 52 is actuated to expel several high-speed jets of air, the battery is forced off the conveyor belt, sent to the exterior via outlet 65, and supplied to a bin. In this case, while battery 1 is moving, the signal from proximity sensor 51 and the output of signal processor 40 are not simultaneous. Thus the time lag must be corrected by timing adjustor 53 so as to adjust the actuation of valve 52 properly.

Figure 26:
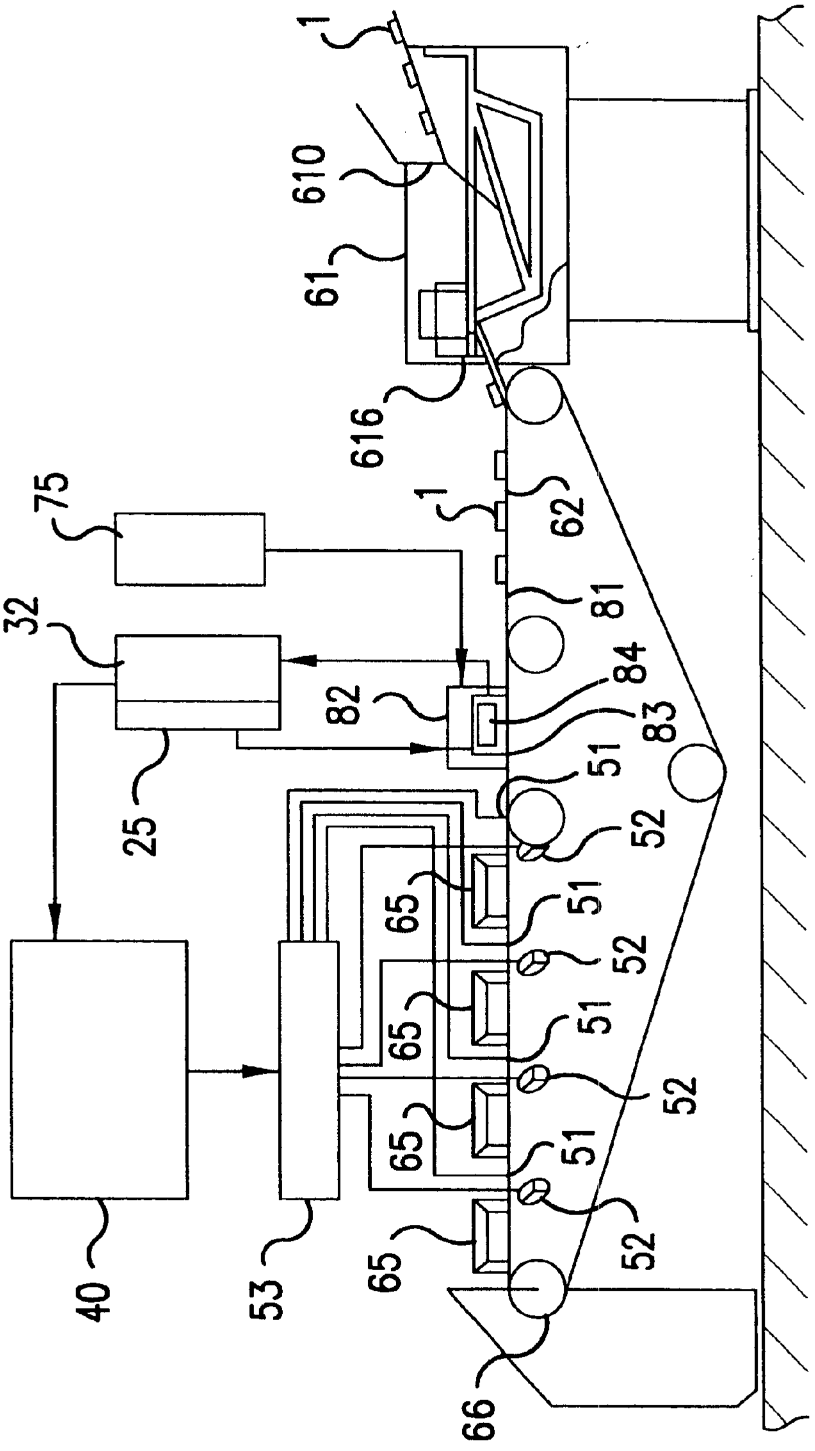
FIG. 26 shows a concrete example of the overall configuration of a sorting apparatus.

An example of an actual battery sorting apparatus which uses a number of the above-described elements is shown in FIG. 26. As can be seen in the drawing, the batteries 1 to be sorted are loaded onto linear conveyor 62 via inlet 610. The batteries 1 transported by linear conveyor 62 travel on conveyor belt 81, which is operated by drive motor 66. They are brought past AC excitation coil 83, which comprises generator coil 82, comprising weak magnetostatic field generating device 10 to generate a weak magnetic field, and alternating magnetic field generating device 20, which generates an alternating magnetic field. They also go past detector coil 84, which comprises induced magnetic field change detecting device 30 to detect changes in the induced magnetic field.

Coil 82, which generates a weak magnetic field, is connected to DC power supply 75. Coil 83, which generates an AC magnetic field, is connected to amplifier 25. Coil 84, which detects changes in the induced magnetic field, is connected to amplifier 32. The signal indicating that the battery has been detected is input into signal processing device 40.

Signal processing device 40 outputs a signal corresponding to what sort of battery this is to timing adjuster 53. The signals from proximity sensors 51, which are mounted at each outlet through which a given sort of battery will exit, are also input into timing adjuster 53. These signals are used to actuate electromagnetic valves 52 and send the battery through the appropriate outlet.

Figure 27:
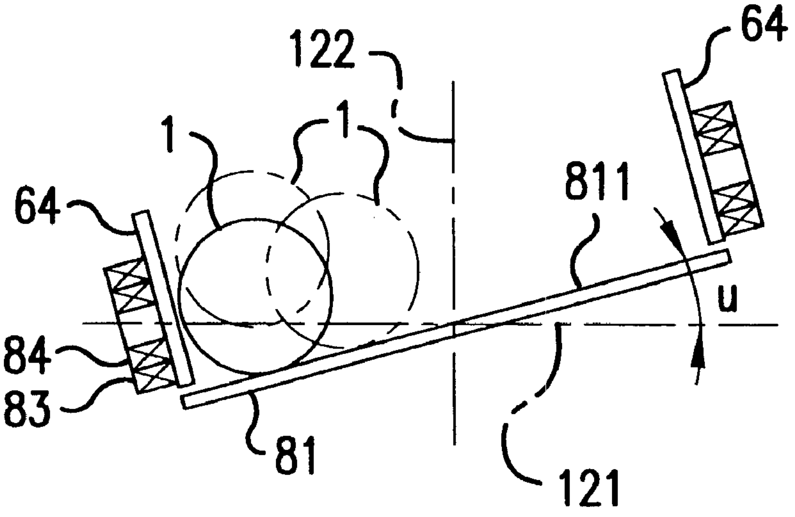
FIG. 27 illustrates a mechanism for stabilizing the transport of the batteries.

As discussed above, at the same time that coil 82 applies a weak field to the battery, coil 83 applies an alternating field. Coil 84 detects the field induced by the eddy current generated in the battery. If at this time battery 1 should shift in any direction as it is being transported on conveyor belt 81, the distance between it and the detector coil 84 would change, and the accuracy of detection would suffer. It is thus essential that battery 1 not shift about as it is being transported on conveyor belt 81, and that its position be stabilized. As can be seen in FIG. 27, the surface 811 of conveyor belt 81 is tilted at a fixed angle u with respect to horizontal surface 121. However, with this sort of apparatus, the vibration of conveyor belt 81 is liable to cause battery 1 to shift up and down or sideways, as shown by the dotted lines in FIG. 2. This makes it impossible to achieve positional stability.

Figure 28:
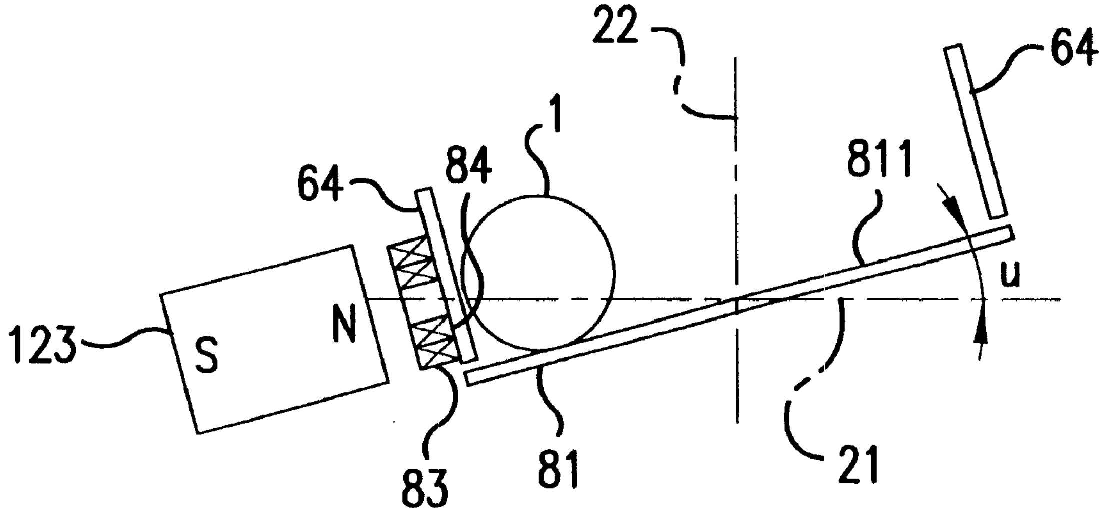
FIG. 28 shows a first preferred embodiment of a device for stabilizing the position of the batteries.

FIG. 28 shows a preferred embodiment of a device for stabilizing the position of the battery. The device is viewed from a position at a right angle to the direction of transport. In the drawing, 1 is the battery transported on conveyor belt 81, which has a guide wall 64 on either side. 83 is the coil (hereafter called the “generator coil”) which generates a local alternating magnetic field and applies it to the battery 1. 84 Is the coil (hereafter called the “detector coil”) for detecting the induced magnetic field generated in and around battery 1 when the alternating field is applied. These coils are placed against the outer surface of the guide wall 64. The surface 811 of conveyor belt 81 is tilted at a fixed angle u with respect to horizontal surface 121. 123 is a magnet which is placed on the outer side of the detector coil 84 so that it can exert magnetic force on the battery 1. A number of such magnets 123 may be placed along the length of conveyor belt 81, mainly opposite the detector coil 84, or a single magnet may extend over a given length. The magnet 123 may be a permanent magnet, or it may be an electromagnet.

In this embodiment, the battery 1 being transported on conveyor belt 81 is on a surface 811 which is tilted as described above. This tilt causes the battery to go to the lowest portion of the surface 811. The magnetic force of magnet 123, which is beyond detector coil 84, pulls the battery toward the detector coil. Thus when battery 1 is in the position where it can be detected by the detector coil 84, the magnet 23 will pull it toward the coil. This scheme maintains a fixed distance between the detector coil 84 and battery 1 and thus insures a high accuracy of detection.

Figure 29:
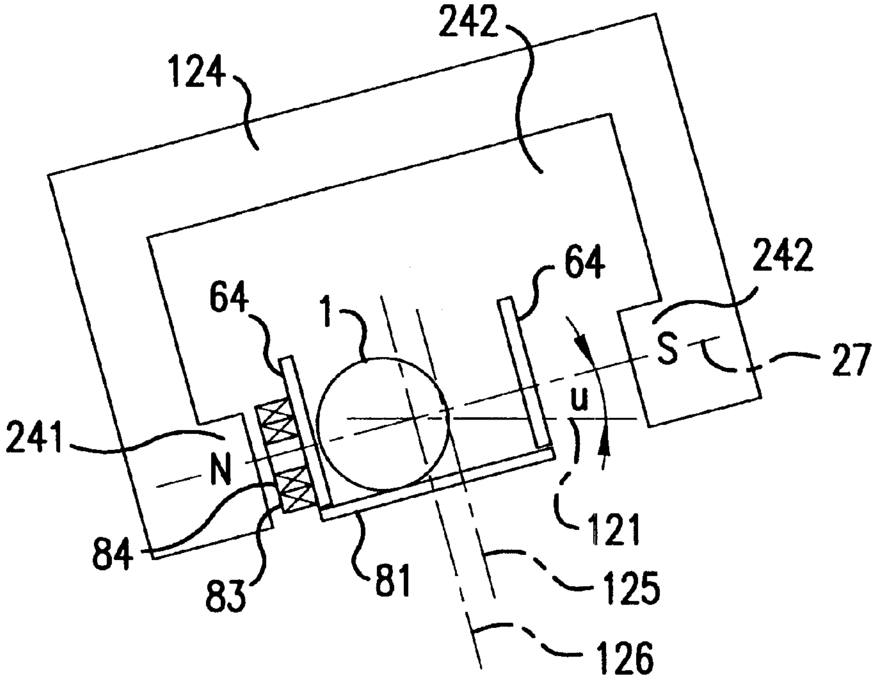
FIG. 29 shows a second preferred embodiment of a device for stabilizing the position of the batteries having a configuration corresponding to that in FIG. 28.

FIG. 29 shows another preferred embodiment of a device for stabilizing the position of the battery. It is viewed from the same perspective as the embodiment in FIG. 28. In this embodiment, a U-shaped magnet 124 is disposed so that one of its poles 241 is just beyond the detector coil 84. In the magnetic gap between poles 241 and 242 of the magnet 124 are conveyor belt 81, which is used to convey the battery 1; the generator coil 83; and detector coil 84. The magnet 124 may be a permanent magnet or an electromagnet. Other aspects of this configuration are identical to those of the embodiment shown in FIG. 28. Identical components have been given the same reference numbers as in FIG. 28.

In this embodiment, conveyor belt 81 and the battery 1 being transported on the belt 81 are placed in the magnetic gap between poles 241 and 242 of U-shaped magnet 124. When battery 1 travels through the magnetic gap, the magnetic force of pole 241 will draw it toward the detector coil 84. In this i embodiment, the use of a U-shaped magnet 124 makes it more difficult for the field to be interrupted. A strong field is achieved, and battery 1 is reliably drawn close to detector coil 84.

Figure 30:
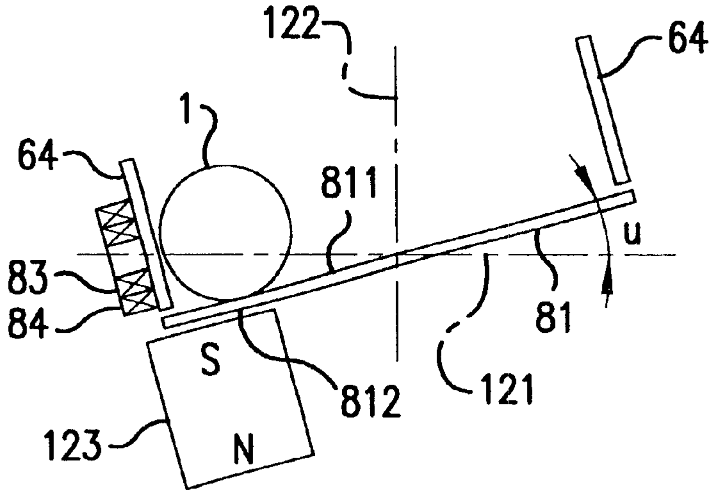
FIG. 30 shows a third preferred embodiment of a device for stabilizing the position of the batteries also having a configuration which corresponds to that in FIG. 28.

FIG. 30 shows a third preferred embodiment of a device for stabilizing the position of the battery. In this embodiment, magnet 123 is placed under conveyor belt 81, which is tilted just as in the previous embodiments. The magnet is placed next to the undersurface 812 of the belt on its lower side. The magnet 123 may be a permanent magnet or an electromagnet. Other aspects of this configuration are identical to those of the first embodiment, and have been given the same reference numbers. In this embodiment, magnet 123 is placed under conveyor belt 81 on its lower side. This means that the attractive force of the magnet 123 draws battery 1 to surface 811 of conveyor belt 81. In the vicinity of the magnet 123, battery 1 will experience much less slippage on surface 811. The frictional coefficient between the battery 1 and conveyor belt 81 is increased. Battery 1 moves in a stable fashion and is reliably drawn close to detector coil 84.

Figure 31:
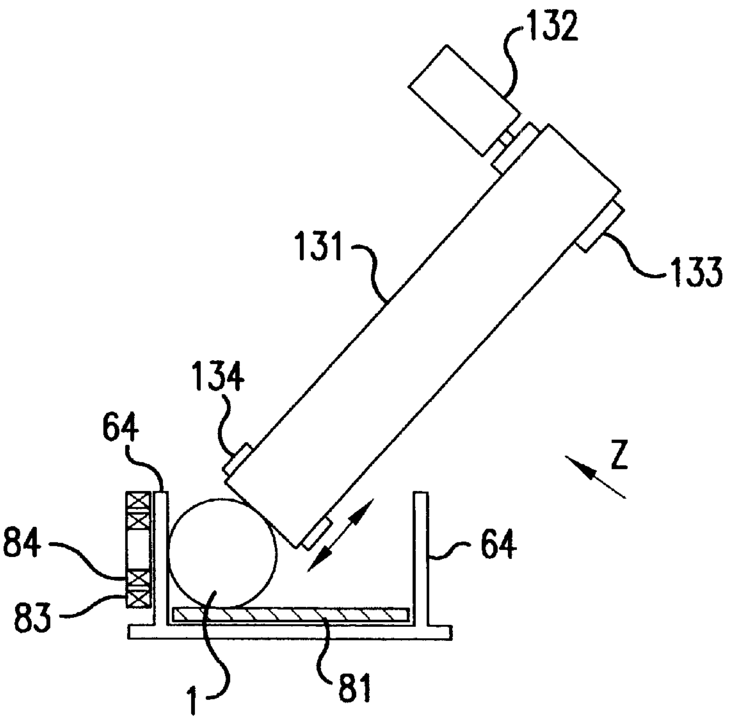
FIG. 31 shows a fourth preferred embodiment of a device for stabilizing the position of the batteries having a configuration which is viewed from a position at a right angle to the path of the batteries.
Figure 32:
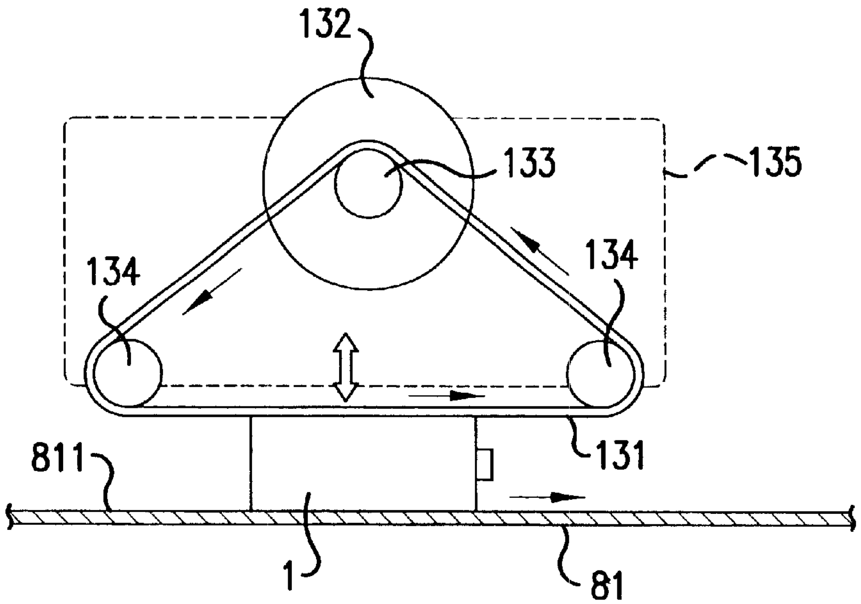
FIG. 32 shows the apparatus of FIG. 31 viewed from arrow Z in FIG. 31.

FIGS. 31 and 32 show a fourth preferred embodiment of a device for stabilizing the position of the battery. FIG. 31 is viewed from a location at a right angle to the direction in which the battery travels. FIG. 32 is a view of the device in FIG. 31 from the direction of arrow Z. In this embodiment, a magnet is not used as in the foregoing three embodiments. Instead, battery 1 is brought closer to detector coil 84 mechanically.

In FIGS. 31 and 32, 131 is a position-stabilizing belt. It is mounted in the shape of a triangle on a drive roller 133 and two idler rollers 134. 132 is a drive motor. Its output shaft is connected to the drive roller 133. When the drive motor 132 rotates drive roller 133, the position-stabilizing belt 131 is conveyed around the three rollers 133 and 134. The drive motor 132, drive roller 133, the two idle rollers 134 and the position-stabilizing mechanism mounted on these rollers are all mounted on elevator 135. When the elevator 135 moves up and down as shown by the arrow in the drawing, its stabilizing belt 131 exerts pressure on the exterior of battery 1. Thus the position-stabilizing mechanism 100, as shown in FIG. 31, has a position-stabilizing belt 131, which is tilted so as to push battery 1 simultaneously toward that portion of surface 811 of conveyor belt 81 which is closest to the detector coil 84 and toward the lower interior surface of guide wall 64. The guide wall 64 is shaped like an angular letter “U”, of which the flat bottom forms floor 641. The conveyor belt 81 runs on the floor 641. In this embodiment, as drive motor 132 is operating belt 131, elevator 135 lowers it as shown by the arrow in FIG. 32. When the lower surface of the position-stabilizing belt 131 presses against the exterior of battery 1, the battery 1 is pushed by a fixed pressure toward the lower interior surface of guide wall 64 and toward that portion of surface 811 of conveyor belt 81 which is closest to the detector coil 84. In this way the battery 1 is always brought close to the detector coil 84, and its position is stabilized.

Unlike the preceeding three embodiments, in this embodiment no magnet is used. Instead, battery 1 is brought close to detector coil 84 mechanically. This eliminates the noise which interferes with the detection signal from detector coil 84 when a magnet is used, thus allowing a high accuracy of detection to be maintained.

Figure 33:
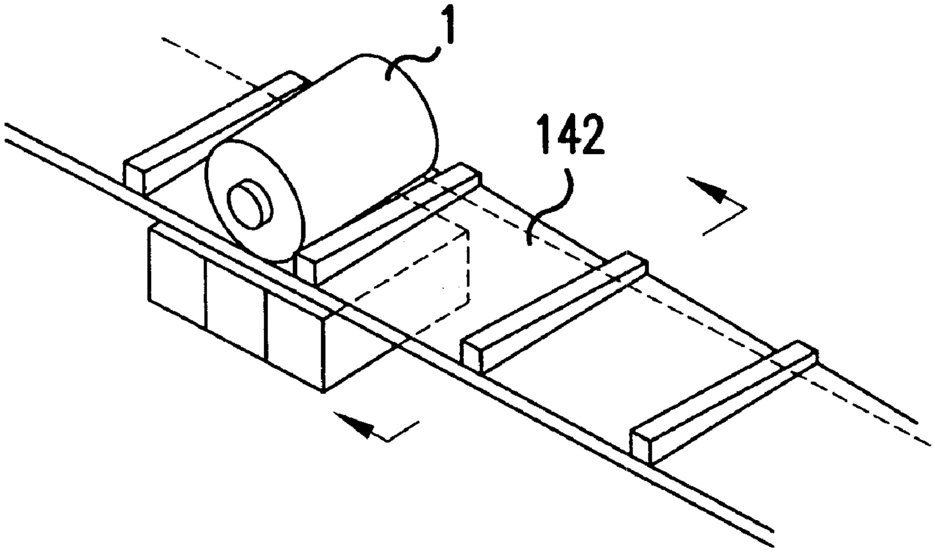
FIG. 33 is a perspective drawing of a fifth preferred embodiment of a device for stabilizing the position of the batteries.
Figure 34:
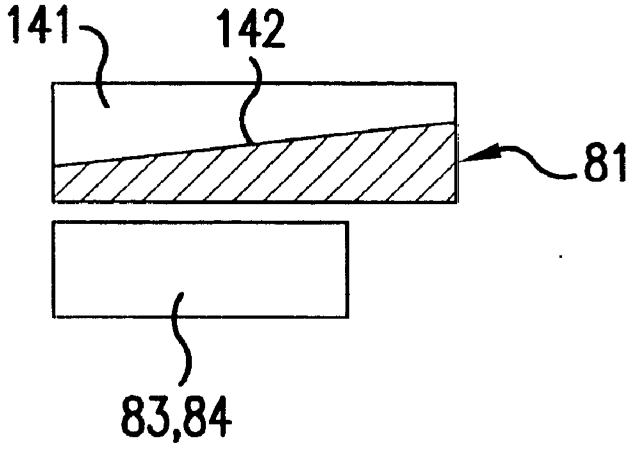
FIG. 34 is a cross section taken along line Y—Y in FIG. 33.

FIGS. 33 and 34 show a fifth preferred embodiment of a device for stabilizing the position of the battery. FIG. 33 is a perspective drawing, and FIG. 34 is a cross section taken along line Y—Y in FIG. 33. In this embodiment, a so-called “trough” conveyor belt 81 has projections or ribs 141 at fixed intervals along its length. In FIGS. 33 and 34, the upper surface of the belt 81 has projections 141 at regular intervals, and the projections go all the way across the belt. The spacing or pitch of the projections 141 is such that a battery 1 can be loaded between two projections 141 so that it cannot move at all along the length of the belt.

Between the projections 141 are angled surfaces 142. The portion of each angled surface at the base of the projections 141 which is closer to the detector coil 84 is lower, and the portion which is opposite the coil is higher. This causes battery 1 to move to the lower portion of the slanted surface 142, where it is closer to the detector coil 84. In this way, a battery 1 being transported on conveyor belt 81 will always go to the lower portion of the slanted surface 142 between the projections 141. In other words, it will always fall into a position quite close to detector coil 84.

Figure 35:
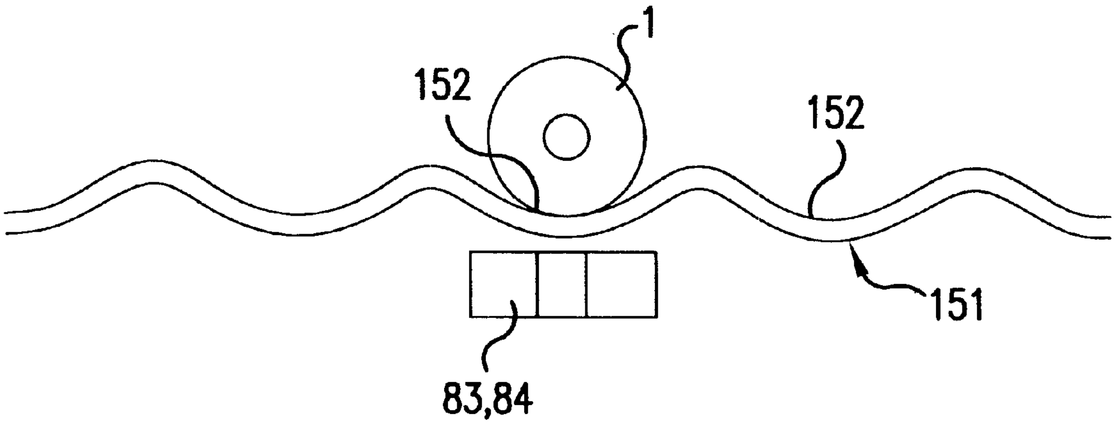
FIG. 35 is a side view of the main components in a sixth preferred embodiment of a device for stabilizing the position of the batteries.

FIG. 35 is a rough side view of a sixth preferred embodiment of a device for stabilizing the position of the battery. This embodiment is a modified version of the fifth embodiment. Conveyor belt 151 has a wavy surface with valleys 152 in which batteries 1 can fit. The detector coil is placed below one of the valleys 152. With this design, the battery 1 on conveyor belt 151 is above detector coil 84 and inevitably approaches quite near the detector coil 84.

Figure 36:
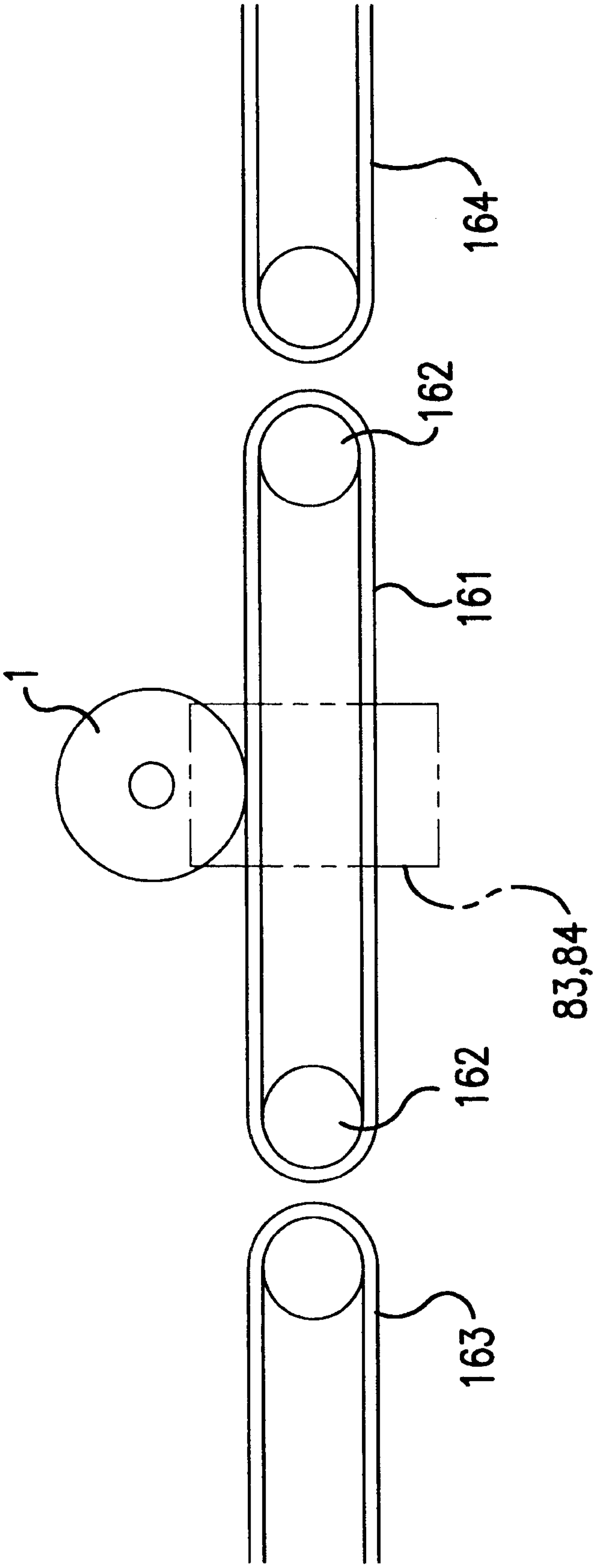
FIG. 36 is a side n view of the main components in a seventh preferred embodiment of a device for stabilizing the position of the batteries.

FIG. 36 is a side view of a seventh preferred embodiment of a device for stabilizing the position of the battery. In this embodiment, belt 161 has magnetic powder glued to its surface. Battery 1 is loaded onto the magnetic belt 161 and transported. In FIG. 36, 161 is the belt on which a coating of magnetic powder has been glued. When the two belt wheels 162 rotate, the belt moves. The detector coil 84 is placed near the side of the magnetic belt 161. 163 is the air shooter belt placed upstream from the magnetic belt 161; 164 is the ordinary rubber belt downstream from the magnetic belt 161 which expels the battery. In this embodiment, the battery 1 which is transported from air shooter 163 by magnetic belt 161 is temporarily fixed to the belt 161 by its magnetic force. When it has passed close by detector coil 84 and its induced magnetic field has been detected, it is expelled on rubber belt 164. In this embodiment, battery 1 faces detector coil 84 while it is temporarily held on magnetic belt 161. Thus the battery 1 is completely prevented from moving in any way relative to magnetic belt 161 when its induced magnetic field is detected. This scheme achieves a high accuracy of detection.

Figure 37:
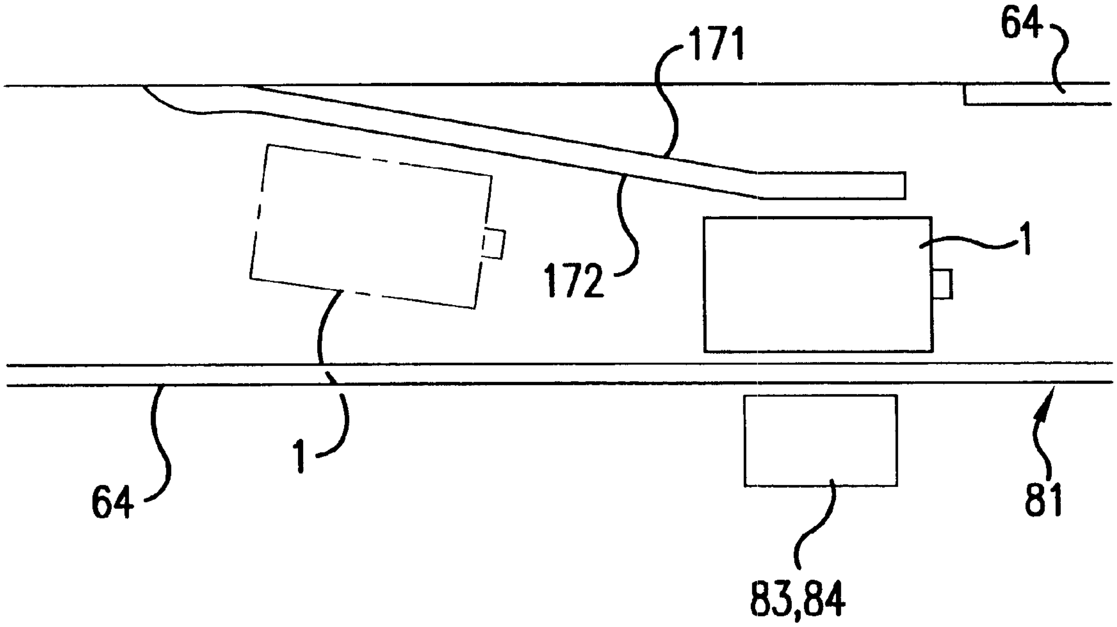
FIG. 37 is a plan view of the main components in an eighth preferred embodiment of a device for stabilizing the position of the batteries.

FIG. 37 is a plan view of the essential parts of an eighth preferred embodiment of a device for stabilizing the position of the battery. In this embodiment there is an oblique guide panel 171 on the surface of conveyor belt 81. Detector coil 84 is placed on the side of the conveyor where the path is narrowed by the guide panel 171. In FIG. 37, the guide panel 171 is formed by removing a portion of guide wall 64 on conveyor belt 81. Battery 1 is guided by interior wall 172 to a position facing detector coil 84. The portion of the path in front of the detector coil 84 is gradually contracted so that it becomes more narrow. In this embodiment, battery 1 is mechanically guided by guide panel 171 so that it arrives in a reliable fashion at a location near detector coil 84. This scheme uses a simple configuration to achieve a stable transport and positioning of the battery.

FIG. 38 illustrates a preferred embodiment of a spacing control device for spacing the batteries at equal intervals. In this embodiment, batteries 1 are continuously expelled from outlet 616 of the rotary conveyor and travel along until they are stopped by rotary control disk 623 inside linear guide 624. Rotary control disk 623 has a space 622 on its periphery in which a single battery will fit. When the disk rotates, the battery in space 622 moves toward conveyor belt 81. When this battery 1 reaches outlet 626, which is on a portion of round guide 625, a jet of air blown out of air nozzle 627 loads it onto conveyor belt 81. By setting an appropriate speed for the rotation of rotary control disk 623, the spacing between batteries 1 on conveyor belt 81 can be kept fixed at an appropriate value.

EFFECTS OF THE INVENTION

As is discussed above, the basic invention comprises a method of sorting batteries in which a weak magnetostatic field and an alternating magnetic field containing numerous frequency components are applied to a continuously conveyed battery. The induced magnetic field created by the eddy current induced in the battery is then detected. The strength of the induced magnetic field and the orthogonal components of its phase are measured with respect to the alternating field. Based on the relationship between the type and size of the battery with respect to the orthogonal components which were previously obtained, the battery is then sorted according to type and size. In this way all types of batteries can be sorted according to size and principal components without applying a saturation field to the battery.

With the preferred embodiment in which the magnetostatic filed is between 0.01 T and 0.3 T. the strength of the magnetostatic field is reduced to 1/10 that used in the prior art. This reduces the resistance of the battery on the conveyor and allows it to be transported smoothly without reducing the accuracy with which the induced magnetic field can be detected.

The invention also includes an embodiment comprising a method for sorting batteries in which an alternating magnetic field containing numerous frequency components is applied to a continuously conveyed battery. The induced magnetic field created by the eddy current induced in the battery is then detected. The strength of the induced magnetic field and the orthogonal components of its phase are measured with respect to the alternating field. Based on the relationship between the type and size of the battery with respect to the orthogonal components which were previously obtained, the battery is then sorted according to type and size. This method enables the device for generating a weak magnetic field to be omitted.

With the embodiment of the inventive method in which the relationship between the classification and size of the battery and the measured parameters comprises a plurality of measured tolerance ranges, the relationship between the type and size of the battery and the strength and phase of its induced magnetic field has a fixed tolerance range for every frequency of the alternating field. By combining the tolerance ranges and making a judgment, the type and size of the battery can be determined.

With the embodiment of the invention in which the magnetostatic field is applied at a level low enough not to hinder the feed of the batteries, the transport of the batteries is not interfered with. Thus the batteries can be conveyed at a high speed.

With the basic apparatus of the invention, an obliquely oriented first disk and a horizontal second disk surrounding the first are rotated on an axis which intersects both disks. The outer disk is rotated faster than the inner disk. Each battery is inserted into the disks, which results in the batteries being lined up with fixed intervals between them. This row of batteries is conducted via a conveyor belt past a device which generates an alternating magnetic field, and one which detects changes in the induced magnetic field. This device detects changes in the strength and phase of the induced magnetic field which are due to the composition of the battery for at least three sorts of frequency components. A signal processing device performs “AND” and “OR” operations on the data which are detected, and outputs them as a signal corresponding to what sort of battery this is. This output is used to send each sort of battery to a specific location. This method embodiment utilizes a simplified apparatus.

With the apparatus which is further developed to include a device which generates a weak magnetic field past which the batteries are conducted, all types of batteries can be sorted according to size and principal components without applying a saturating field to the battery.

With the embodiment of the apparatus according to the invention in which the conveyor belt is tilted in the direction of its width and a device is used which lines up the batteries, the batteries are stabilized in position as they pass the coil. This improves the accuracy with which the batteries are sorted.

With the embodiment of the invention in which the alternating magnetic field generator and the induced magnetic field detector are each provided with a plurality of coils, the coil used as the device to generate an alternating magnetic field and the coil used as the device to detect changes in the induced magnetic field are the sort of coil which induces a local field. Thus a larger and a smaller coil can be arranged on the same shaft and used together to detect larger and smaller batteries. This improves the accuracy with which the apparatus can sort batteries of different sizes.

With the embodiments of the inventive method in which the battery is drawn toward the detection means by magnetic force when it reaches the proper position, it is assured that the distance between the battery and the detection means will remain constant, thus allowing the passage of the battery to be stabilized. This scheme maintains a high accuracy of detection.

If the apparatus is configured with a U-shaped magnet and the conveyor belt passes between the poles of the magnet, it is less likely for the magnetic field to be interrupted and a stronger field is achieved. The passage of the battery thus is further stabilized.

If the apparatus is configured so that the induced magnetic field is detected from beside the conveyor belt and and the magnet is placed below the conveyor, the battery is drawn toward the conveyor surface. This increases the frictional coefficient between the battery and the surface of the conveyor, thus further stabilizing the passage of the battery.

With the embodiments of apparatus according to the invention provided with a position stabilizing mechanism or a conveyor belt with a plurality of ridges and intervening depressions or an undulating conveyor belt surface or a guide panel adjacent the detecting means, the battery is brought closer to the detection means by a mechanical device. This eliminates the problem of noise getting into the signal from the detection means which occurs when a magnet is used. It also stabilizes the transport of the battery.

With the embodiment of the apparatus according to the invention in which the battery is carried on a magnetic belt, the battery is attracted toward the belt surface. This prevents any relative movement as the induced magnetic field is detected. It thus stabilizes the transport of the battery and maintains a high accuracy of detection.

With the apparatus embodiment of the invention provided with a spacing control device comprising a battery storage feeder and a spacing control disk, the batteries are transported on the conveyor belt with fixed intervals between them. The signal for each battery can be detected without being affected by adjacent batteries, so the accuracy of sorting is improved. The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A method of sorting batteries, comprising:

continuously conveying a plurality of kinds of batteries;

successively aligning the batteries to be sorted;

successively applying a weak non-saturating magnetostatic field of between 0.01 T (Teslas) and 0.3 T and at least an alternating magnetic field having a plurality of different frequencies to the batteries to be sorted in order to induce an eddy current in each of the batteries;

detecting an induced magnetic field created by the eddy current induced in said each of the batteries in order to measure strength and phase-shift of the detected induced magnetic field with respect to the plurality of different frequencies; and determining a classification and size of said each of the batteries based on a previously obtained relationship of battery classification and size relative to the measured strength and phase-shift of the induced magnetic field generated by the plurality of different frequencies.

2. A method of sorting batteries according to claim 1, wherein said weak magnetostatic field is between 0.01 T and 0.07 T when the kinds of batteries are size AA or smaller.

3. A method of sorting batteries according to claim 1, wherein the previously obtained relationship has a plurality of predetermined tolerance ranges of magnetic field strength and phase-shift for each frequency, and said determining step determines the classification and size of said each of the batteries by a combination of the tolerance ranges at the different frequencies.

4. A method of sorting batteries according to claim 1, wherein:

the plurality of different frequencies is selected from each of high, intermediate, and low frequency ranges;

the induced alternating magnetic field is analyzed at each of the plurality of different frequencies into orthogonal components which are a respective sine component and a respective cosine component; and a logical operation of "AND" and "OR" is executed to determine whether or not the respective sine component and cosine component belong to a zone defined by sine components and cosine components determined beforehand for the battery classification and size of each of the batteries for said each of the plurality of different frequencies to sort out the classification and size of the battery to be sorted.

5. A method of sorting batteries, comprising:

continuously conveying a plurality of kinds of batteries;

successively aligning the batteries to be sorted;

successively applying an alternating magnetic field having a plurality of different frequencies to the batteries to be sorted in order to induce an eddy current in each of the batteries;

detecting an induced magnetic field created by the eddy current induced in said each of the batteries in order to measure strength and phase-shift of the induced magnetic field with respect to the plurality of different frequencies; and determining a classification and size of said each of the batteries based on a previously obtained relationship of battery classification and size relative to the measured strength and phase-shift of the induced magnetic field generated by the plurality of different frequencies, wherein the previously obtained relationship has a plurality of predetermined tolerance ranges of magnetic field strength and phase-shift for each frequency, and said determining step determines the classification and size of said each of the batteries by a combination of the tolerance ranges at the different frequencies.

6. A method of sorting batteries according to claim 5, wherein:

the plurality of different frequencies is selected from each of high, intermediate, and low frequency ranges;

the induced alternating magnetic field is analyzed at each of the plurality of different frequencies into orthogonal components which are a respective since component and a respective cosine component; and a logical operation of "AND" and "OR" is executed to determine whether or not the respective sine component and cosine component belong to a zone defined by sine components and cosine components determined beforehand for the battery classification and size of each of the batteries for said each of the plurality of different frequencies to sort out the classification and size of the battery to be sorted.

7. A sorting apparatus for sorting a continuously conveyed succession of batteries, said apparatus comprising:

an arranging and conveying device which arranges and continuously conveys the batteries at regular intervals, said device comprising a rotary-type conveyor and a line-type conveyor, said rotary-type conveyor having an obliquely oriented first disk rotating on a first axis, and a horizontal second disk surrounding the first disk and rotating on a second axis, said first and second axes being position to intersect each other, the second disk being rotating faster than the first disk; the batteries being forwarded in the rotary-type conveyor and arranged by centrifugal force; the line-type conveyor conveying the arranged batteries from the rotary-type conveyor at regular intervals;

an alternating magnetic field generator which applies an alternating magnetic field successively to each of the batteries;

a weak magnetostatic field generator which applies a weak non-saturating magnetostatic field of between 0.01 T and 0.3 T to the batteries passing by a position where an attitude of each of the batteries is stabilized on the conveyor belt;

an induced magnetic field detector which successively detects magnetic field strength and phase changes of an induced magnetic field in the batteries for at least 3 different frequencies;

a signal processor which determines a classification and size of each battery by applying "AND" and "OR" logical operations to the detected magnetic field strength and phase changes of the induced magnetic field, and outputs a sorting output signal for each battery; and a sorter which sorts the batteries to specific locations according to the sorting output signals.

8. A sorting apparatus for sorting batteries according to claim 7, further comprising a weak magnetostatic field generator which applies a weak magnetostatic field successively to each of the batteries.

9. A sorting apparatus for sorting batteries according to claim 8, wherein said line-type conveyor is tilted along an axis of its width in order to line up and convey the batteries so as to stabilize the position of each battery as the battery passes said weak magnetostatic field generator and said alternating magnetic field generator.

10. A sorting apparatus for sorting batteries according to claim 7, wherein said alternating magnetic field generator is provided with a plurality of generating coils to generate an alternating magnetic field, and said induced magnetic field detector is provided with a plurality of detecting coils to detect the strength and phase changes of the induced magnetic field, wherein the generating coils and the detecting coils are both local acting coils, and wherein both said generating coils and said detecting coils each comprise a large type coil and a small type coil for respectively detecting the composition of large and small batteries.

11. A sorting apparatus for sorting batteries, comprising:

a transporter in which batteries are introduced onto a disk rotating at high speed to be disposed and oriented on a periphery of the disk by centrifugal force acting on the batteries while revolving on the disk;

a conveyor belt for conveying the oriented batteries;

a weak non-saturating magnetostatic field generator which applies a weak magnetostatic field of between 0.01 T and 0.3 T to the batteries passing by a position where an attitude of each of the batteries is stabilized on the conveyor belt; and an alternating magnetic fields generator which applies a plurality of alternating magnetic fields at frequencies selected from each of high, intermediate, and low frequency ranges to the batteries at the position where the attitude of each of the batteries is stabilized on the conveyor belt.

12. A sorting apparatus for sorting batteries according to claim 11, further comprising:

an analyzer for analyzing induced alternating magnetic fields from application of the alternating magnetic fields into a sine component and a cosine component at each of the frequencies; and a determiner for determining whether or not the sine component and the cosine component at each of the frequencies belong to a zone defined by sine components and cosine components determined beforehand for each classification and size of batteries for each of the frequencies to sort out the classification and size of the batteries.

13. A sorting apparatus for sorting batteries according to claim 11, wherein:

the conveyor belt is tilted along an axis of width in order to line up and convey the batteries so as to stabilize the position of each of the batteries passing thereby on a lower side position of inclination of the conveyor belt; and the weak magnetostatic field generator and the alternating magnetic fields generator are provided at the lower side position of inclination of the conveyor belt.

* * * * *